United States Patent
Shalaby

(10) Patent No.: US 12,449,536 B1
(45) Date of Patent: Oct. 21, 2025

(54) ULTRAPRECISION FREQUENCY-DOMAIN LIGHT DETECTION AND RANGING (LiDAR) SYSTEM FOR REMOTE MICRO-MOVEMENT SENSING

(71) Applicant: IMAM MOHAMMAD IBN SAUD ISLAMIC UNIVERSITY, Riyadh (SA)

(72) Inventor: Mohamed Yehia Mohamed Shalaby, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/056,225

(22) Filed: Feb. 18, 2025

(51) Int. Cl.
  *G01S 17/26* (2020.01)
  *G01S 7/481* (2006.01)
  *G01S 7/484* (2006.01)
  *G01S 7/4865* (2020.01)
  *G01S 17/88* (2006.01)

(52) U.S. Cl.
  CPC ............ *G01S 17/26* (2020.01); *G01S 7/4818* (2013.01); *G01S 7/484* (2013.01); *G01S 7/4865* (2013.01); *G01S 17/88* (2013.01)

(58) Field of Classification Search
  CPC ......... G01S 17/26; G01S 7/4818; G01S 17/88
  See application file for complete search history.

(56) References Cited

U.S. PATENT DOCUMENTS

| | | | | |
|---|---|---|---|---|
| 6,329,648 B1 * | 12/2001 | Delatorre | ............... | G01D 5/266 250/227.12 |
| 8,094,292 B2 | 1/2012 | Park et al. | | |
| 2009/0147267 A1 * | 6/2009 | Lawall | ................... | G01H 9/004 73/657 |
| 2011/0174078 A1 * | 7/2011 | Chinn | .................... | G01H 9/004 73/657 |

(Continued)

FOREIGN PATENT DOCUMENTS

JP   2024028083 A  *  3/2024

OTHER PUBLICATIONS

Machine Translation of JP2024028083A (Year: 2024).*

*Primary Examiner* — Yuqing Xiao
*Assistant Examiner* — Zhengqing Qi
(74) *Attorney, Agent, or Firm* — Oblon, McClelland, Maier &Neustadt, L.L.P.

(57) ABSTRACT

An ultraprecision frequency-domain Light Detection and Ranging (LiDAR) system for remote micro-movement sensing includes a laser diode with a bandpass filter configured to modulate power using RF signals to generate intensity-modulated optical signals. The LiDAR system includes a Michelson interferometer to split generated optical signals via a 50/50 directional coupler into two optical paths. A first optical path includes a fiber-optic delay line with a silver-coated end reflecting phase-shifted optical signals towards a photodetector. A second optical path features a semiconductor optical amplifier amplifying the generated optical signals, with an optical collimator and a target beyond a free-space propagation region. A photodetector is connected (Continued)

to the 50/50 directional coupler that receives both the phase-shifted and amplified optical signals, converting them to electrical signals. A feedback loop, including a bandpass filter and a frequency-domain analyzer detects frequency shifts caused by micro-movements of the target.

20 Claims, 18 Drawing Sheets

(56) References Cited

U.S. PATENT DOCUMENTS

| | | | |
|---|---|---|---|
| 2015/0148655 A1* | 5/2015 | Haupt | A61B 8/0875 |
| | | | 600/407 |
| 2020/0033112 A1 | 1/2020 | Lau et al. | |
| 2020/0251610 A1* | 8/2020 | Dülk | A61B 5/0066 |
| 2020/0309952 A1* | 10/2020 | Imaki | G01S 7/4815 |
| 2021/0405194 A1* | 12/2021 | Tsuchida | G01S 17/34 |
| 2022/0171035 A1 | 6/2022 | Kim et al. | |
| 2024/0337479 A1 | 10/2024 | Grieco et al. | |

* cited by examiner

ULTRAPRECISION FREQUENCY-DOMAIN LIGHT DETECTION AND RANGING (LiDAR) SYSTEM FOR REMOTE MICRO-MOVEMENT SENSING

CROSS REFERENCE TO RELATED APPLICATIONS

The present application is related to "Hybrid Free Space Oscillators For Ultraprecision Sensor Applications", U.S. application Ser. No. 19/056,155 filed on Feb. 18, 2025, which is incorporated herein by reference in its entirety.

BACKGROUND

Technical Field

The present disclosure is directed to optical remote sensing, more particularly to an ultraprecision frequency-domain LiDAR system and a method for detecting micro-movements of a target with the ultraprecision frequency-domain LiDAR system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Light detection and ranging (LiDAR) technology is used in a wide array of applications including autonomous vehicles, environmental monitoring, industrial automation, and geospatial analysis. Conventionally, LiDAR systems use laser pulses or continuous-wave signals to measure distances and velocities, enabling precise Three-Dimensional (3D) mapping and target object detection. Over time, the LiDAR systems have evolved, with notable advancements that include frequency-modulated continuous-wave (FMCW) LiDAR approaches, solid-state LiDAR approaches, hybrid LiDAR approaches, and phase-modulated continuous-wave (PhMCW) LiDAR approaches. These advancements have enhanced the capabilities of the existing LiDAR systems, enabling the existing LiDAR systems to operate in diverse environments with greater accuracy, efficiency, and adaptability.

In particular, the FMCW LiDAR approach offers superior anti-interference characteristics and direct velocity measurement capabilities, making the FMCW LiDAR approach suitable for automotive and industrial applications. The solid-state LiDAR approach offers higher reliability, compactness, and cost efficiency and is used in applications requiring low-power and high-resolution measurements. The hybrid LiDAR approach that combines LiDAR technology with visual sensors has been developed conventionally to enhance robustness in challenging environments, such as low-light or featureless terrain. Additionally, the PhMCW LiDAR approach offers greater precision by integrating phase modulation for ranging accuracy.

Despite these advancements, these existing LiDAR systems have inherent limitations when it comes to detecting micro-movements, particularly on a remote scale. Specifically, conventional LiDAR systems are designed for long-range detection and mapping, focusing on large-scale measurements of target objects over a wide area. As a result, these existing LiDAR systems lack the sensitivity required to detect small-scale movements or vibrations of the target objects with micrometer-level precision. This limitation has made it challenging to apply the existing LiDAR systems for high-precision micro-movement detection, such as monitoring subtle vibrations in machinery, structures, or biological systems. Furthermore, the existing LiDAR systems are not optimized for use in hazardous environments where direct physical access to the target objects may not be possible, such as active volcanic zones or earthquake-prone areas. These hazardous environments require a LiDAR system that can operate remotely and with high sensitivity to minute changes.

In addition, currently existing high-precision sensing systems, such as those used for micro-movement detection, often involve complex setups and expensive components, making these existing high-precision sensing systems impractical for widespread deployment in real-world applications. The high cost and complexity of these existing high-precision sensing systems have limited their usage to specialized applications, preventing them from being more broadly adopted in industries where micro-movement detection is crucial, such as structural health monitoring, machinery diagnostics, or non-invasive medical applications.

Due to above-listed challenges, an integration of optoelectronic oscillators (OEOs) has recently gained attention as a promising solution for achieving high-precision sensing. The OEOs are known for their ability to generate stable RF signals and convert variations in environmental parameters, such as displacement or vibration, into measurable frequency shifts. These characteristics make the OEOs particularly useful in applications where ultraprecision measurements are required, such as in distance measurement, acoustic sensing, and vibration analysis. However, while the OEOs have shown great potential, there has been a gap in integrating the OEOs with the LiDAR technology to achieve ultraprecision frequency-domain sensing for remote micro-movement detection. This gap limits the ability of existing LiDAR systems to detect small-scale displacements and vibrations with the sensitivity necessary for critical applications.

Some features of the present disclosure were described by the inventors in "Direction-Aware Optoelectronic Fiber Gyroscope" published by Optoelectronics and Advanced Material-Rapid Communication, Vol. 13, No. 7-8, July 2019, which is incorporated by reference in its entirety. This reference is directed to a gyroscope and there is no mention of target displacement measurement.

Despite the above-mentioned advancements and introduced technologies, existing LiDAR systems face significant challenges, particularly when applied in harsh environments and for micro-movement detection. Issues such as atmospheric interference, high costs, and signal processing complexity limit their effectiveness and widespread deployment. To address these challenges, there is a need of a new LiDAR system that combines the strengths of various technologies, such as OEOs and fiber-optic components, while minimizing environmental impacts and cost.

Accordingly, it is one object of the present disclosure to provide a method and a system for detecting micro-movements of a target with an ultraprecision frequency-domain LiDAR system.

SUMMARY

In an exemplary embodiment, an ultraprecision frequency-domain Light Detection and Ranging (LiDAR) system for remote micro-movement sensing is described. The ultraprecision frequency-domain LiDAR system includes a laser diode connected to a power source. The ultraprecision frequency-domain LiDAR system includes a bandpass filter connected to the laser diode. The bandpass filter is configured to modulate a power provided by the power source by a Radio Frequency (RF) signal. The modulated power causes the laser diode to generate intensity modulated optical signals. The ultraprecision frequency-domain LiDAR system includes a Michelson interferometer. The Michelson interferometer includes a 50/50 directional coupler connected to the laser diode. The 50/50 directional coupler is configured to split the intensity modulated optical signals into a first optical path and a second optical path. The first optical path includes a fiber-optic delay line configured to generate phase shifted intensity modulated optical signals and a silver coated end connected to the fiber-optic delay line at a distance $l_1$ from the laser diode. The silver coated end is configured to reflect the phase shifted intensity modulated optical signals back towards the 50/50 directional coupler. The second optical path includes a Semiconductor Optical Amplifier (SOA) configured to amplify the intensity modulated optical signals on the second optical path to compensate for signal losses, an optical collimator connected between the SOA and a free-space propagation region, and a target located beyond the free-space propagation region at a distance $l_2$ from the laser diode. The target is configured to reflect the amplified intensity modulated optical signals back towards the 50/50 directional coupler along the second optical path. The ultraprecision frequency-domain LiDAR system includes a photodetector connected to the 50/50 directional coupler. The photodetector is configured to receive the phase shifted intensity modulated optical signals and the amplified intensity modulated optical signals and convert the phase-shifted intensity modulated optical signals and the amplified intensity modulated optical signals into electrical signals. The ultraprecision frequency-domain LiDAR system includes a feedback loop including the bandpass filter and a frequency-domain analyzer including one of a spectrum analyzer, a phase detector, and a Phase-Locked Loop (PLL). The frequency-domain analyzer is configured to identify frequency shifts in the electrical signals induced by micro-movements of the target.

In another exemplary embodiment, a method for detecting micro-movements of a target with an ultraprecision frequency-domain Light Detection and Ranging (LiDAR) system is described. The method includes generating, by a laser diode, Radio Frequency (RF) intensity-modulated optical signals. The method includes splitting, with a 50/50 directional coupler, the RF intensity-modulated optical signals into a first optical stream and a second optical stream. The method includes phase-shifting the first optical stream by transmitting the first optical stream through a first optical path comprising a fiber-optic delay line. The method includes reflecting, by a silver coated end connected to the fiber-optic delay line at a distance $l_1$ from the laser diode, the phase shifted intensity modulated optical signals back towards the 50/50 directional coupler. The method includes transmitting the second optical stream through a second optical path. The method includes collimating, by an optical collimator, the second optical stream. The method includes transmitting the collimated second optical stream through a free-space propagation region to the target. The method includes reflecting, by the target, the collimated second optical stream back into the optical collimator. The method includes amplifying, by a Semiconductor Optical Amplifier (SOA) connected between the 50/50 directional coupler and the optical collimator, the reflected collimated second optical stream. The method includes recombining, by the 50/50 directional coupler, the reflected collimated second optical stream with the phase shifted intensity modulated optical signals. The method includes transmitting the recombined reflected collimated second optical stream and the phase shifted intensity modulated optical signals to a photodetector. The method includes converting, by the photodetector, the recombined reflected collimated second optical stream and the phase shifted intensity modulated optical signals into electrical signals. The method includes generating, by a bandpass filter in a feedback loop, RF signals from the electrical signals. The method includes intensity modulating a power signal provided to the laser diode with the RF signals. The method includes analyzing frequency shifts in the RF signals corresponding micro-movements of the target using a frequency-domain analyzer, wherein the frequency-domain analyzer comprises one of a spectrum analyzer, a phase detector and a phase-locked loop (PLL).

In yet another exemplary embodiment, a non-transitory computer readable medium having instructions stored therein that, when executed by one or more processor, cause the one or more processors to perform a method for detecting micro-movements of a target with an ultraprecision frequency-domain Light Detection and Ranging (LiDAR) system is described. The method includes generating, by a laser diode, Radio Frequency (RF) intensity-modulated optical signals. The method includes splitting, with a 50/50 directional coupler, the RF intensity-modulated optical signals into a first optical stream and a second optical stream. The method includes phase-shifting the first optical stream by transmitting the first optical stream through a first optical path comprising a fiber-optic delay line. The method includes reflecting, by a silver coated end connected to the fiber-optic delay line at a distance $l_1$ from the laser diode, the phase shifted intensity modulated optical signals back towards the 50/50 directional coupler. The method includes transmitting the second optical stream through a second optical path. The method includes collimating, by an optical collimator, the second optical stream. The method includes transmitting the collimated second optical stream through a free-space propagation region to the target. The method includes reflecting, by the target, the collimated second optical stream back into the optical collimator. The method includes amplifying, by a Semiconductor Optical Amplifier (SOA) connected between the 50/50 directional coupler and the optical collimator, the reflected collimated second optical stream. The method includes recombining, by the 50/50 directional coupler, the reflected collimated second optical stream with the phase shifted intensity modulated optical signals. The method includes transmitting the recombined reflected collimated second optical stream and the phase shifted intensity modulated optical signals to a photodetector. The method includes converting, by the photodetector, the recombined reflected collimated second optical stream and the phase shifted intensity modulated optical signals into electrical signals. The method includes generating, by a bandpass filter in a feedback loop, RF signals from the electrical signals. The method includes intensity modulating a power signal provided to the laser diode with the RF signals. The method includes analyzing frequency shifts in the RF signals corresponding micro-movements of the target using a frequency-domain analyzer, wherein the frequency-domain analyzer comprises one of a spectrum analyzer, a phase detector and a phase-locked loop (PLL).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
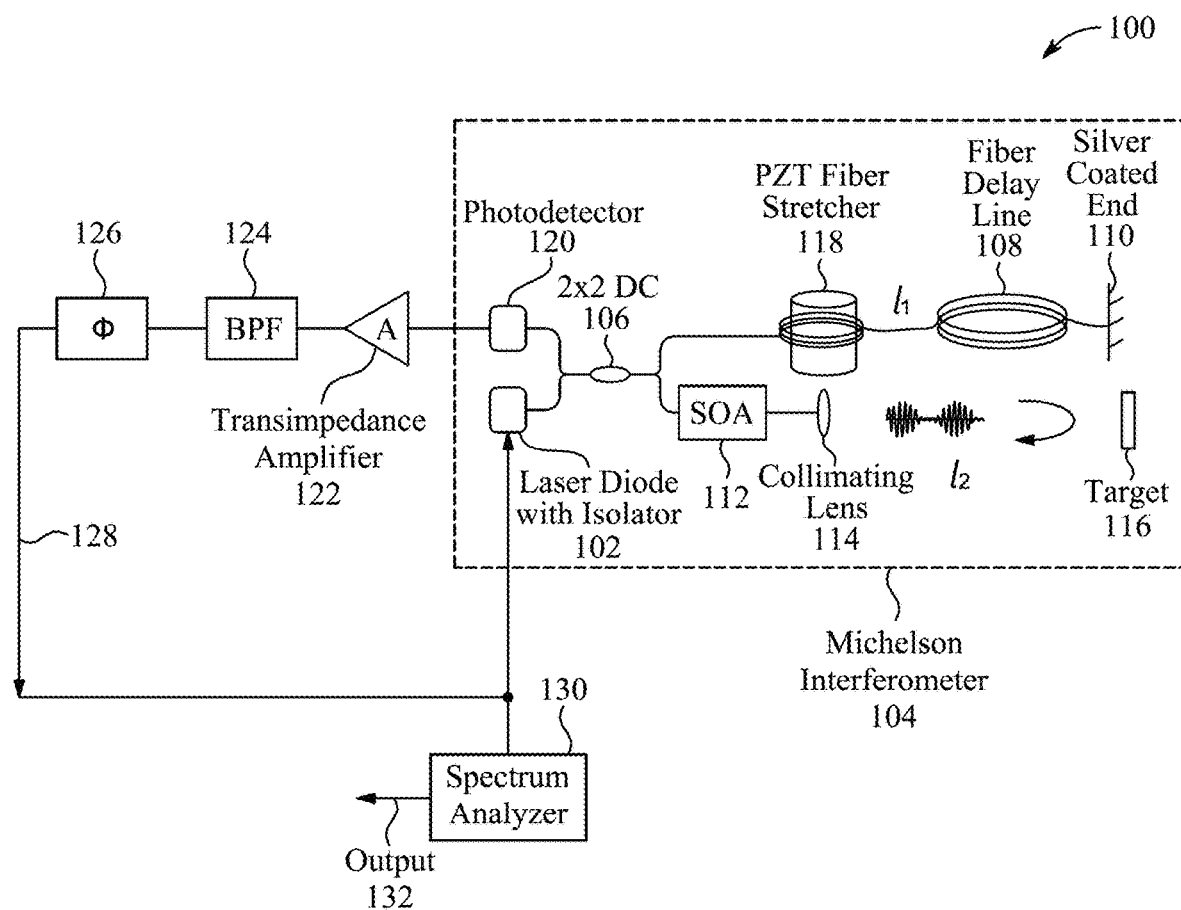
FIG. 1 is an exemplary block diagram depicting a basic configuration of an ultraprecision frequency-domain Light Detection and Ranging (LiDAR) system, according to certain embodiments.

In the drawings, like reference numerals designate identical or corresponding parts throughout the several views. As used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to an ultraprecision frequency-domain light detection and ranging (LiDAR) system for remote micro-movement sensing and a method for detecting micro-movements of a target with the ultraprecision frequency-domain LiDAR system. The method includes generating, by a laser diode, radio frequency (RF) intensity-modulated optical signals. Once the RF intensity-modulated optical signals are generated, the RF intensity-modulated optical signals are split into a first optical stream and a second optical stream using a 50/50 directional coupler. The method includes phase-shifting the first optical stream by transmitting the first optical stream through a first optical path including a fiber-optic delay line. The method includes reflecting, by a silver coated end connected to the fiber-optic delay line at a distance $l_1$ from the laser diode, the phase shifted intensity modulated optical signals back towards the 50/50 directional coupler. The method includes transmitting the second optical stream through a second optical path. The method includes collimating, by an optical collimator, the second optical stream. The method includes transmitting the collimated second optical stream through a free-space propagation region to the target. The method includes reflecting, by the target, the collimated second optical stream back into the optical collimator. The method includes amplifying, by a semiconductor optical amplifier (SOA) connected between the 50/50 directional coupler and the optical collimator, the reflected collimated second optical stream. The method includes recombining, by the 50/50 directional coupler, the reflected collimated second optical stream with the phase shifted intensity modulated optical signals. The method includes transmitting the recombined reflected collimated second optical stream and the phase shifted intensity modulated optical signals to a photodetector. The method includes converting, by the photodetector, the recombined reflected collimated second optical stream and the phase shifted intensity modulated optical signals into electrical signals. The method includes generating, by a bandpass filter in a feedback loop, RF signals from the electrical signals. The method includes intensity modulating a power signal provided to the laser diode with the RF signals. The method includes analyzing frequency shifts in the RF signals corresponding micro-movements of the target using a frequency-domain analyzer, wherein the frequency-domain analyzer comprises one of a spectrum analyzer, a phase detector and a phase-locked loop (PLL).

Referring now to FIG. 1, the present disclosure provides an exemplary block diagram 100 depicting a basic configuration of an ultraprecision frequency-domain LiDAR system. The exemplary block diagram 100 of the ultraprecision frequency-domain LiDAR system includes a laser diode 102, a Michelson interferometer 104, a 50/50 direction coupler represented as 2×2 DC 106, a fiber delay line 108, a silver coated end 110, a Semiconductor Optical Amplifier (SOA) 112, a collimating lens 114 (i.e., an optical collimator), a target 116, a piezoelectric (PZT) fiber stretcher 118, a photodetector 120, a transimpedance amplifier 122, a bandpass filter (represented as BPF) 124, a phased clock generator 126, a feedback loop 128, a spectrum analyzer 130, and an output 132.

The ultraprecision frequency-domain LiDAR system is based on the laser diode 102 that is connected to a power source. The laser diode 102 is connected to a power source. Examples of the power source may include, but are not limited to, a Direct Current (DC) power supply, a regulated power supply, and a battery. The laser diode 102 is configured to generate a coherent light source (also referred to as intensity-modulated optical signals, RF intensity-modulated optical signals, or laser beam). An optical isolator is connected to the laser diode 102. The optical isolator is configured to prevent back reflections within the laser diode 102 from entering the feedback loop 128. The optical isolator is a passive optical device that allows the coherent light source to travel in one direction while blocking any back reflections from traveling in an opposite direction. For example, the optical isolator may be a Faraday optical isolator.

Once the coherent light source is generated the laser diode 102 is configured to direct the coherent light source into the Michelson interferometer 104. The Michelson interferometer 104 plays a key role in splitting the coherent light source into two separate optical paths, i.e., a first optical path (also referred to as a measurement arm) and a second optical path (also referred to as a reference arm). In particular, to split the coherent light source into the two separate optical paths, the Michelson interferometer 104 includes a 50/50 directional coupler (depicted as the 2×2 DC 106). The 50/50 directional coupler is an optical device that is used to split the coherent light source into two equal intensity optical paths. The 50/50 directional coupler ensures that approximately half (i.e., 50%) of the coherent light source, i.e., a first optical stream is directed into the measurement arm, while the other half, i.e., a second optical stream is directed into the reference arm of the Michelson interferometer 104.

In the first optical path, the first optical stream from the coherent light source passes through the fiber-optic delay line 108 which introduces a controlled time delay. In particular, the first optical path includes the fiber-optic delay line 108 and a silver coated end 110 connected to the fiber-optic delay line 108 at a distance $l_1$ from the laser diode 102. The fiber-optic delay line 108 is configured to generate phase shifted intensity modulated optical signals. The fiber-optic delay line has a length selected to optimize phase stability based on the distance $l_1$. The silver coated end 110 is configured to reflect the phase shifted intensity modulated optical signals back towards the 50/50 directional coupler where it the phase shifted intensity modulated optical signals are transmitted to the photodetector 120 with the reflected second optical stream and also into the second optical stream to add the controlled time delay to the second optical stream. The controlled time delay is to allow the ultraprecision frequency-domain LiDAR system to precisely detect the phase shifts caused by the micro-movements of the target 116.

To address potential signal losses in a free-space propagation path (also referred to as a free-space propagation region), the SOA 112 is utilized to maintain an integrity and a strength of the second optical stream of the coherent light source. Additionally, the collimating lens 114 (i.e., the optical collimator) is employed to focus the second optical stream into a parallel form or a collimated form, which minimizes the second optical stream divergence and enables efficient propagation over long distances to interact with distant targets, e.g., the target 116. In particular, the second optical path includes the SOA 112 is configured to amplify the intensity modulated optical signals (i.e., the second optical stream) on the second optical path to compensate for the signal losses. The collimating lens 114 is connected between the SOA 112 and the free-space propagation region, and the target 116 is located beyond the free-space propagation region at a distance $l_2$ from the laser diode 102. The target is configured to reflect the amplified intensity modulated optical signals back towards the 50/50 directional coupler along the second optical path.

The ultraprecision frequency-domain LiDAR system operates with an opto-electronic oscillator that modulates the coherent light source using an RF signal. When the coherent light source reflects off the target 116, any micromovements induce small phase or frequency shifts in the modulated coherent light source, i.e., the amplified intensity modulated optical signals. These returning signals, i.e., the amplified intensity modulated optical signals (also referred to as a reflected collimated second optical stream) are then recombined with a reference beam (i.e., the phase shifted intensity modulated optical signals) in the Michelson interferometer 104. In particular, the 2×2 DC 106 is configured to recombine the reflected collimated second optical stream with the phase shifted intensity modulated optical signals.

As depicted via the exemplary diagram 100, the PZT fiber stretcher 118 is connected between the 2×2 DC 106 and the fiber-optic delay line 108. The PZT fiber stretcher 118 is configured to introduce an initial controlled phase shift on the first optical path (i.e., the measurement arm). The photodetector 120 is connected to the 50/50 directional coupler. The photodetector 120 is configured to receive the phase shifted intensity modulated optical signals and the amplified intensity modulated optical signals and convert the phase-shifted intensity modulated optical signals and the amplified intensity modulated optical signals into electrical signals. In a non-limiting example, the fiber delay line 108 has a long length of about 5 meters configured to produce the delay by increasing the path length of the first optical stream. Further, the phase shifted intensity modulated optical signals reflected by the silver coated end 110 will also pass through the fiber-optic delay line 108, doubling the time delay, and consequently the phase shift between the first optical stream and the second optical stream. The transimpedance amplifier 122 (depicted as A) is connected between the photodetector 120 and the bandpass filter 124 (i.e., the BPA). The transimpedance amplifier 122 is configured to transform the electrical signals to RF voltage signals. The bandpass filter 124 filters the incoming electrical signals, allowing only signals within a specific frequency range (i.e., the RF signals or the RF voltage signals) to pass through. In a non-limiting example, the central frequency of the bandpass filter is set at 1 GHz with a bandwidth of 2 MHz.

The ultraprecision frequency-domain LiDAR system includes the phased clock generator 126. As depicted via the exemplary diagram 100, the phased clock generator 126 is connected between the bandpass filter 124 and the spectrum analyzer 130. The phased clock generator 126 is configured to synchronize the RF voltage signals with a reference signal. The reference signal is a stable and known signal used as a benchmark for comparison. The reference signal helps synchronize and compare an output of the ultraprecision frequency-domain LiDAR system', ensuring accurate measurement and detection of changes, such as phase shifts or frequency shifts (also referred to as a frequency deviation). The feedback loop 128 includes the bandpass filter 124 and a frequency-domain analyzer (i.e., the spectrum analyzer 130). The spectrum analyzer 130 is configured to identify the frequency shifts in the electrical signals induced by the micro-movements of the target 116. Based on the identified frequency shifts, the spectrum analyzer 130 is configured to generate an output 132, i.e., a graph depicting the identified frequency shifts with respect to the micro-movements of the target.

By detecting and analyzing the frequency shifts, the ultraprecision frequency-domain LiDAR system can accurately measure and quantify minute displacements or oscillations of the target 116. This basic configuration of the ultraprecision frequency-domain LiDAR system enables the ultraprecision frequency-domain LiDAR system to achieve high precision in the micro-movement sensing, making the ultraprecision frequency-domain LiDAR system ideal for applications such as structural health monitoring, early detection of volcanic eruptions, and seismic activity.

To experimentally validate the operation of the ultraprecision frequency-domain LiDAR system, the basic configuration of the ultraprecision frequency-domain LiDAR system was implemented as illustrated in FIG. 1. The ultraprecision frequency-domain LiDAR system is designed and calibrated to evaluate its sensitivity to minute displacements or the micro-movements of the target 116 (also referred to as a target object). The following data outlines experimental setup and results obtained from the basic configuration of the ultraprecision frequency-domain LiDAR system. The fiber-optic delay line 108 with a length of $l_1$=5 meters was used to enhance the ultraprecision frequency-domain LiDAR system's phase stability. This length of the fiber-optic delay line 108 ensured effective phase modulation and facilitated the accurate measurement of minute target displacements. The target 116, consisting of a mirror, was positioned approximately 100 meters away on a roof of a nearby building. This setup simulates a remote micro-movement sensing scenario in which the free-space propagation region (also referred to as a free-space branch or the free-space propagation region) of the Michelson interferometer 104 detected the micro-movements of the target 116. The displacement of the target 116 induced the phase shifts that are used to analyze the frequency shifts in the ultraprecision frequency-domain LiDAR system's frequency oscillations. The phase shift refers to a change in a phase of a signal (i.e., the coherent light source), measured in radians or degrees, due to a delay or modification in the signal's propagation path. The frequency shift refers to a change in a frequency of the signal, typically measured in Hertz (Hz), caused by factors such as a Doppler effect or the ultraprecision frequency-domain LiDAR system adjustments (e.g., temperature changes, mechanical vibrations, power supply variations, etc.).

The ultraprecision frequency-domain LiDAR system includes the bandpass filter (i.e., the bandpass filter 124) and the feedback loop 128 components, which are tuned to achieve a stable oscillation frequency of 1 GHz. This stable operating frequency is essential to ensure accurate measurement and detection of the induced frequency shifts caused by the displacement of the target 116. The reflective mirror, i.e., the target 116 that is mounted on a high-precision translational micrometer stage allowed controlled displacements of the target 116. The reflective mirror was displaced in incremental steps, and the resulting change in the ultraprecision frequency-domain LiDAR system's oscillation frequency (i.e., the frequency shift) was measured for each displacement step (this is depicted and explained in FIG. 8 and FIG. 9). The oscillation frequency drift, resulting from the phase shift induced by the reflective mirror's displacement, was monitored using the spectrum analyzer 130. This allowed real-time observation of the frequency shift corresponding to each target micro-movement (also referred to as the target displacement), providing quantitative data for the ultraprecision frequency-domain LiDAR system analysis.

Figure 9:
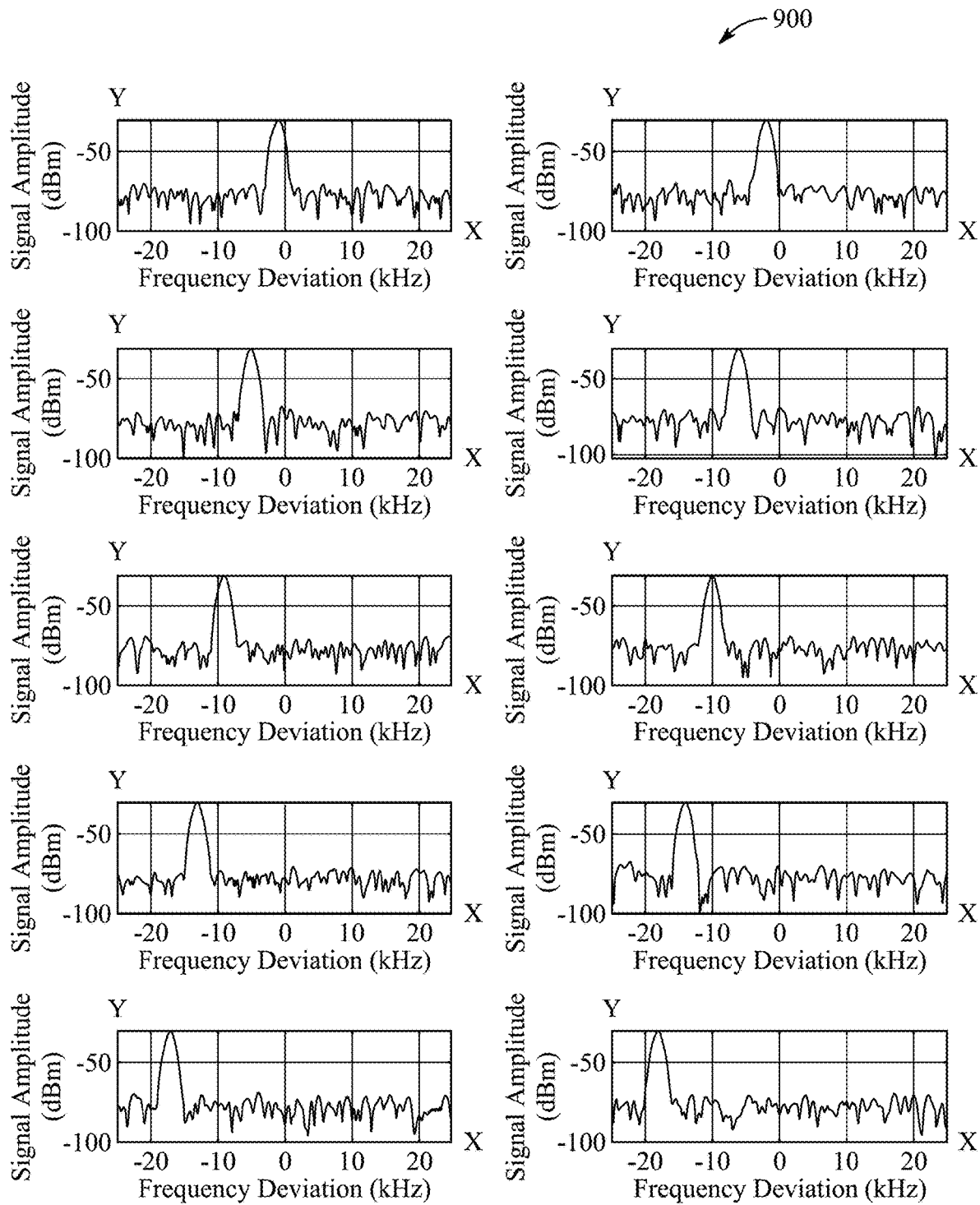
FIG. 9 is an exemplary diagram illustrating frequency deviation measurements with target movement in steps in one direction acquired using a spectrum analyzer, according to certain embodiments.
Figure 9:
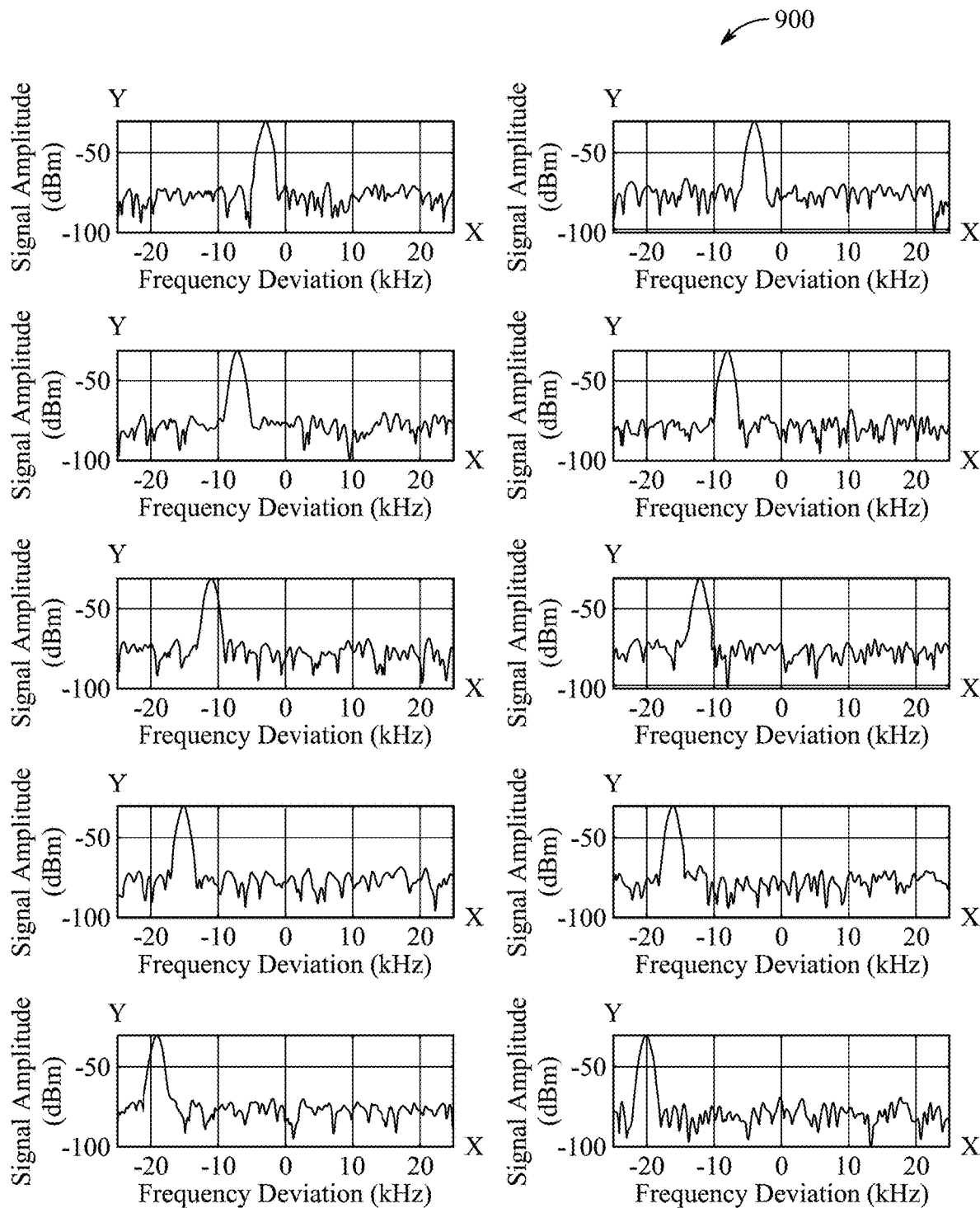
Figure 10:
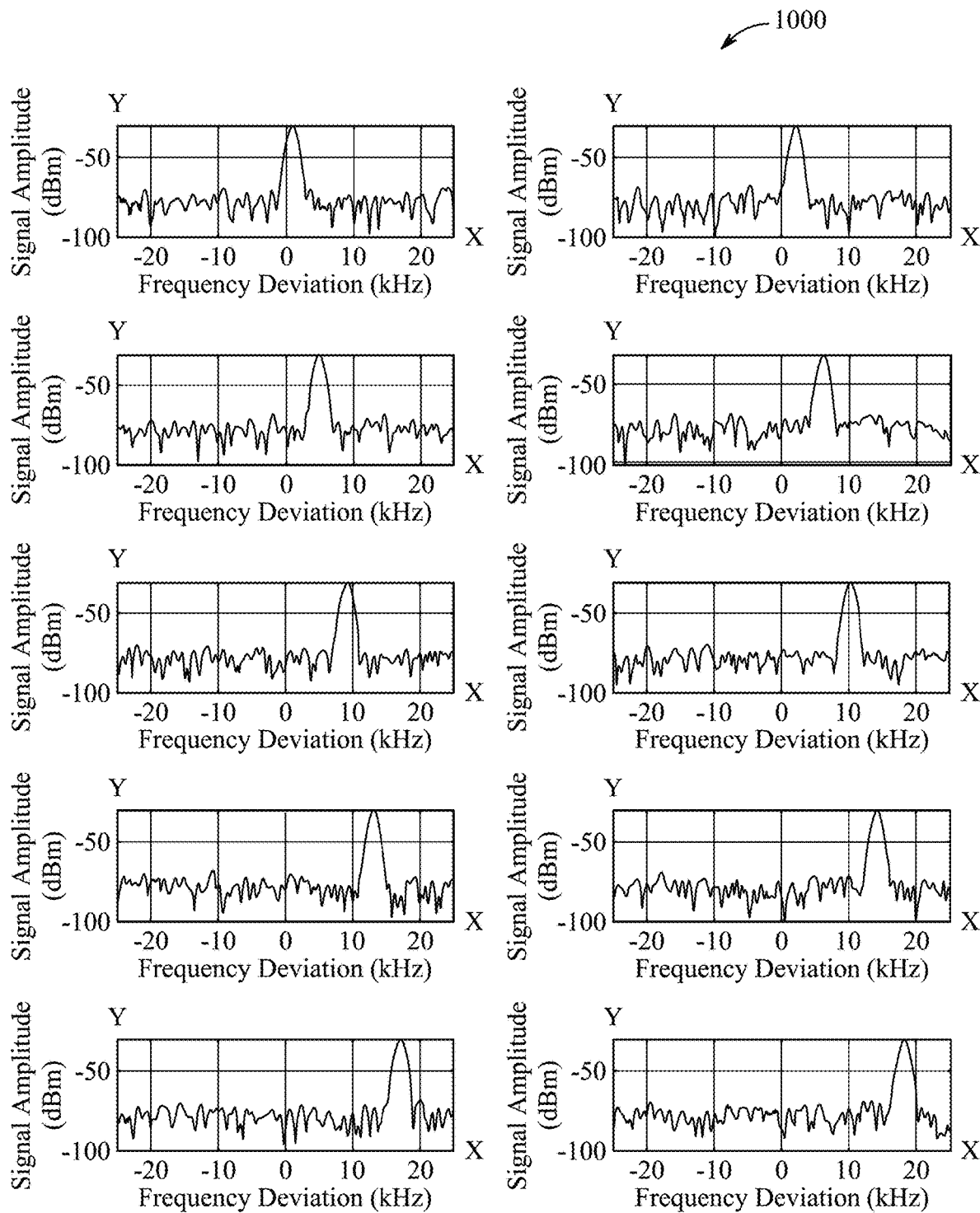
FIG. 10 is an exemplary diagram illustrating frequency deviation measurements with target movement in steps in an opposite direction acquired using a spectrum analyzer, according to certain embodiments.
Figure 10:
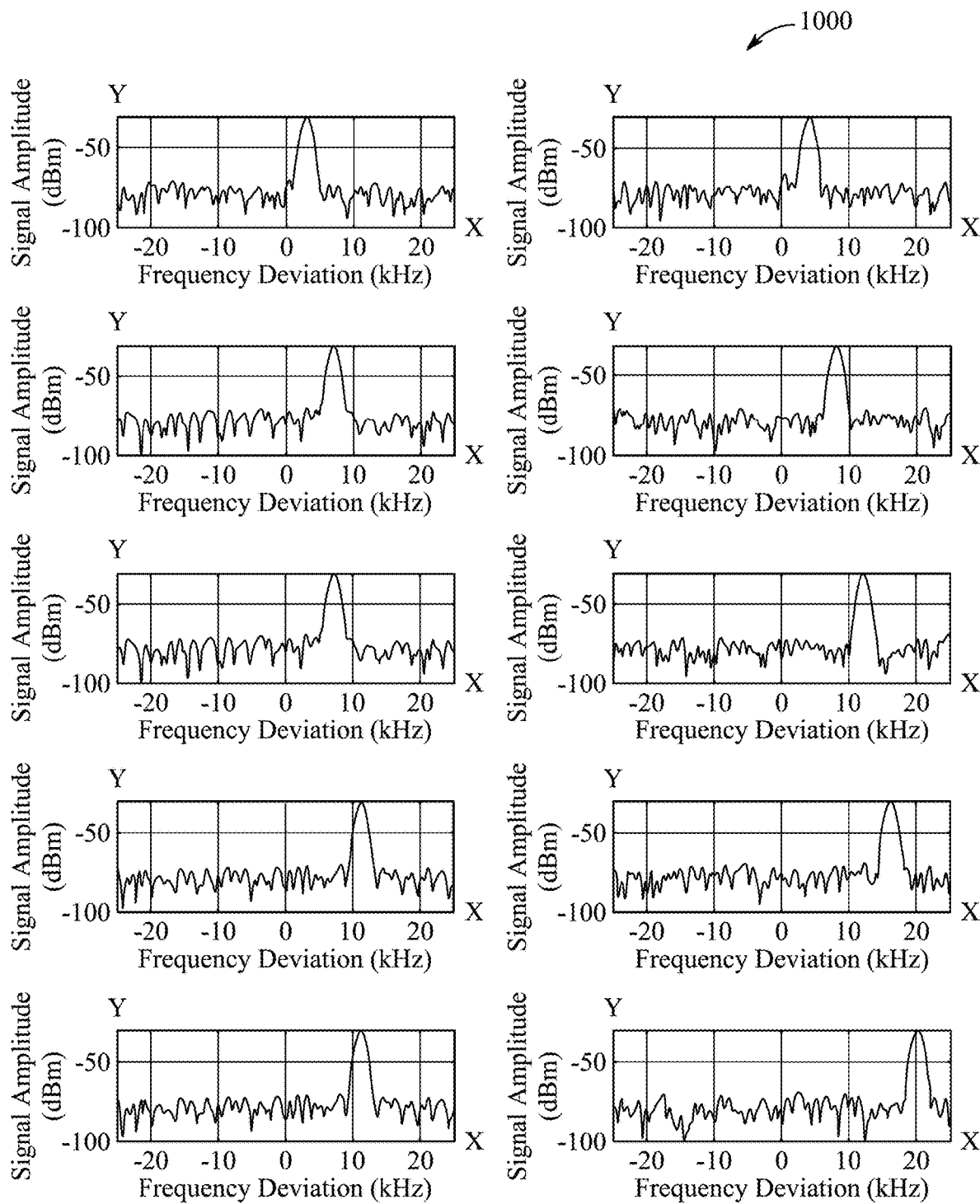

This experiment demonstrated a distinct frequency drift (also referred to as the frequency shifts) in the ultraprecision frequency-domain LiDAR system's oscillation (shown in FIG. 9 and FIG. 10). In particular, the frequency drift refers to a gradual change in the ultraprecision frequency-domain LiDAR system's oscillation frequency caused by the phase shifts induced by the micro-movements of the target 116. A measured frequency shift closely aligned with a theoretical-predictions derived, which establishes the relationship between the micro-movements of the target 116 and the induced frequency shift in the oscillator. This correlation confirms the effectiveness of the ultraprecision frequency-domain LiDAR system in detecting minute micro-movements of the target 116. Despite the target 116 being placed at a considerable distance (i.e., 100 m) in an outdoor environment, the ultraprecision frequency-domain LiDAR system maintained stable operation and accurate frequency tracking. This demonstrates the ultraprecision frequency-domain LiDAR system's resilience to environmental factors, such as atmospheric disturbances.

The results obtained from the above experimental setup confirmed the feasibility and effectiveness of the ultraprecision frequency-domain LiDAR system for the remote micro-movement sensing. The close agreement between the measured frequency drift and the theoretical-predictions validates the accuracy of the ultraprecision frequency-domain LiDAR system's design and its underlying principles. These findings establish a potential of the ultraprecision frequency-domain LiDAR system for a wide range of applications, including structural health monitoring, seismic activity detection, and other remote sensing scenarios that require precise and high-sensitivity displacement measurements. The successful demonstration of the ultraprecision frequency-domain LiDAR system's capability to detect minute micro-movements over large distances underscores the ultraprecision frequency-domain LiDAR system's robustness and potential for deployment in real-world environments.

Figure 2A:
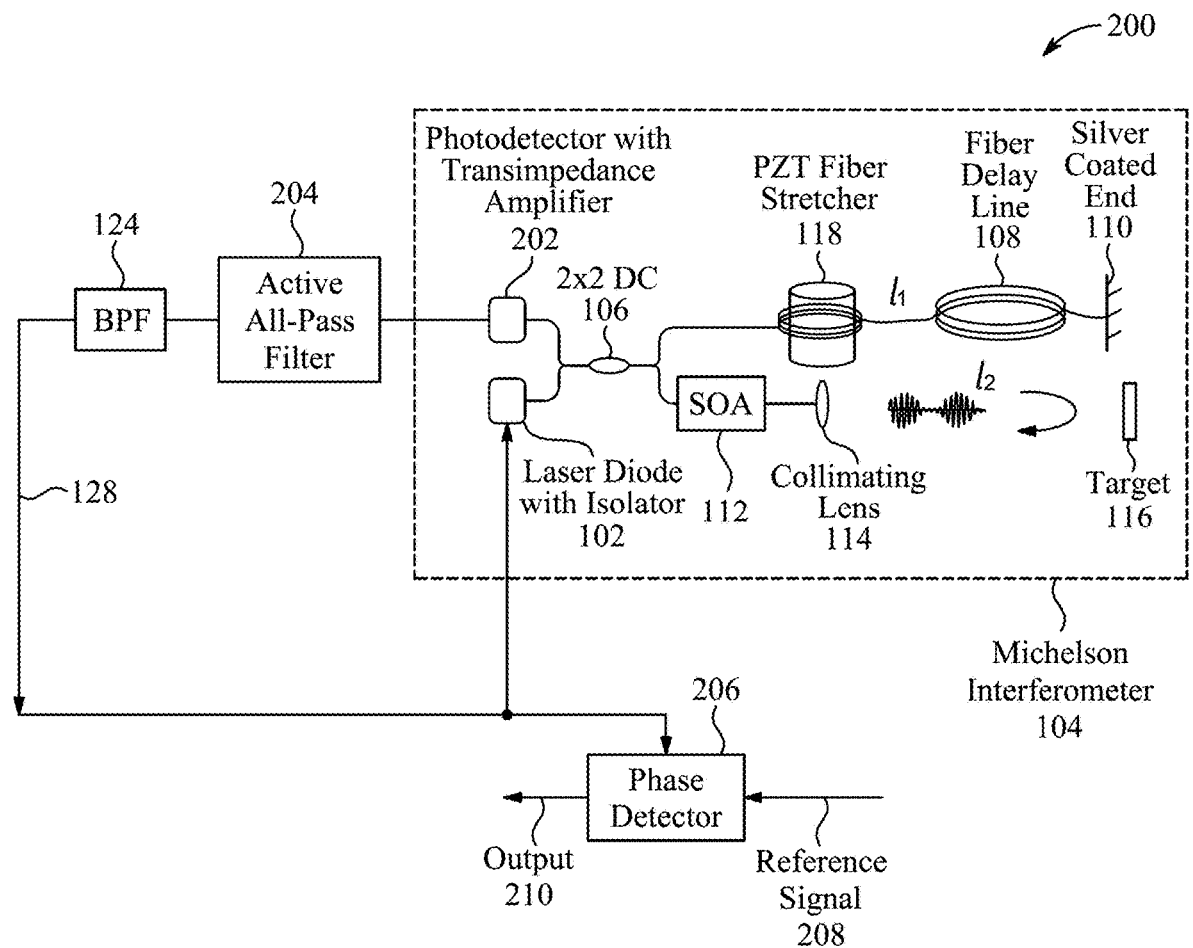
FIG. 2A is an exemplary block diagram depicting another configuration of an ultraprecision frequency-domain LiDAR system utilizing a phase detector, according to certain embodiments.

Referring now to FIG. 2A, the present disclosure provides an exemplary block diagram 200 depicting another configuration of the ultraprecision frequency-domain LiDAR system utilizing a phase detector rather than a spectrum analyzer. The phase detector is configured to measure oscillation frequency drift. The commercial cost of a phase detector is approximately ten percent of the cost of a spectrum analyzer, so provides a more cost-effective solution. As depicted via the exemplary block diagram 200, this configuration of the ultraprecision frequency-domain LiDAR system includes the laser diode 102, the Michelson interferometer 104, the 50/50 direction coupler represented as 2×2 DC 106, the fiber-optic delay line 108, the silver coated end 110, the SOA 112, the collimating lens 114 (i.e., the optical collimator), the target 116 (i.e., a far object under surveillance), the PZT fiber stretcher 118, a photodetector with the transimpedance amplifier 202, an active all-pass filter 204, the bandpass filter (represented as the BPF) 124, the feedback loop 128, and a phase detector 206. In the exemplary block diagram 200 of the ultraprecision frequency-domain LiDAR system depicted in the FIG. 2A, the transimpedance amplifier (e.g., the transimpedance amplifier 122 of FIG. 1) is integrated with the photodetector (e.g., 120), i.e., the photodetector with the transimpedance amplifier 202. The transimpedance amplifier integrated within the photodetector has a same function to that of the transimpedance amplifier 122 shown in FIG. 1. In particular, the transimpedance amplifier is configured to transform the electrical signals to the RF voltage signals.

The ultraprecision frequency-domain LiDAR system, depicted in the FIG. 2A, includes an active all-pass filter 204 in the feedback loop 128. The active all-pass filter 204 is connected between the photodetector with the transimpedance amplifier 202 and the bandpass filter 124. The active all-pass filter 204 is configured to phase shift the RF voltage signals and produce unity gain across all frequencies of the RF voltage signals. The active all-pass filter 204 is designed to introduce a phase shift to the RF voltage signals without altering an amplitude of the RF voltage signal, ensuring that the RF voltage signals maintain a constant unity gain across all frequencies. This allows for precise phase manipulation while preserving the RF voltage signal strength throughout a frequency spectrum.

In the configuration of the ultraprecision frequency-domain LiDAR system depicted in FIG. 2A, the spectrum analyzer 130 is replaced by the phase detector 206. In other words, in the present FIG. 2A, the frequency-domain analyzer is the phase detector 206. In particular, in the present FIG. 2A, in the feedback loop 128, the spectrum analyzer 130 is replaced with the phase detector 206 and the active all-pass filter 204 is incorporated within the feedback loop 128. A reference signal input port 208 is integrated with the phase detector 206. The reference signal input port 208 is configured to receive the reference signal and reduce the frequency drift by comparing the RF voltage signals to the reference signal.

Figure 2B:
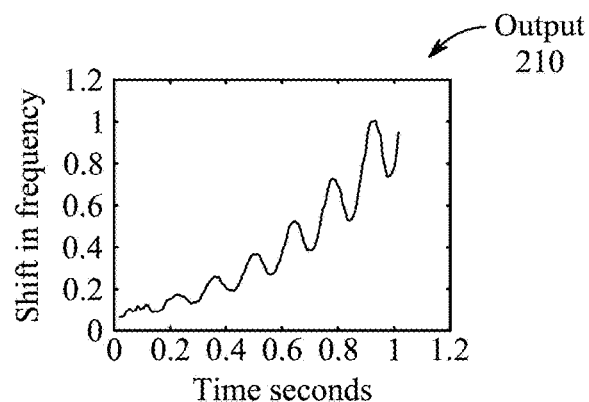
FIG. 2B is an exemplary output from the ultraprecision frequency-domain LiDAR system incorporating the phase detector of FIG. 2A, according to certain embodiments.

The phase detector 206 is configured to measure a phase difference between the reference signal and the RF voltage signals. The phase detector 206 detects minute variations in the phase, which are caused by the micro-movements of the target 116. By providing precise phase measurements, the phase detector 206 enables real-time monitoring of oscillation frequency drift induced by movements of the target 116, allowing the ultraprecision frequency-domain LiDAR system to track the micro-movements of the target 116 with high accuracy. The target 116 corresponds to any object, surface, or entity that exhibits small-scale movements or vibrations. Based on the identified frequency shifts, the phase detector 206 is configured to generate an output 210, i.e., a graph depicting the identified frequency shifts with respect to the micro-movements of the target 116 (shown in FIG. 2B). Examples of the target 116 may include the structural element (e.g., the bridge, the building, or the dam) where the micro-movements caused due to wind, traffic, or seismic activity need to be monitored for structural health, the machinery or the equipment (e.g., the industrial machinery, the turbine, or the engine) where minute vibrations might indicate early signs of wear or malfunction, the biological system (e.g., the human body or the animal body) for monitoring small movements such as heartbeats, tremors, or other biological signals, the geological feature (e.g., the areas near active faults, volcanic zones, or earthquake-prone regions) where minute shifts in the earth's surface are crucial for early warning system, and the like.

The modification in the configuration of the ultraprecision frequency-domain LiDAR system as depicted via the exemplary block diagram 200, enables the direct and continuous measurement of the oscillation frequency drift (also referred to as the frequency shifts) induced by the micro-movements of the target 116. As a result, the ultraprecision frequency-domain LiDAR system enhances real-time phase tracking and improves overall responsiveness, providing more accurate and immediate detection of displacements of the target 116.

Figure 3A:
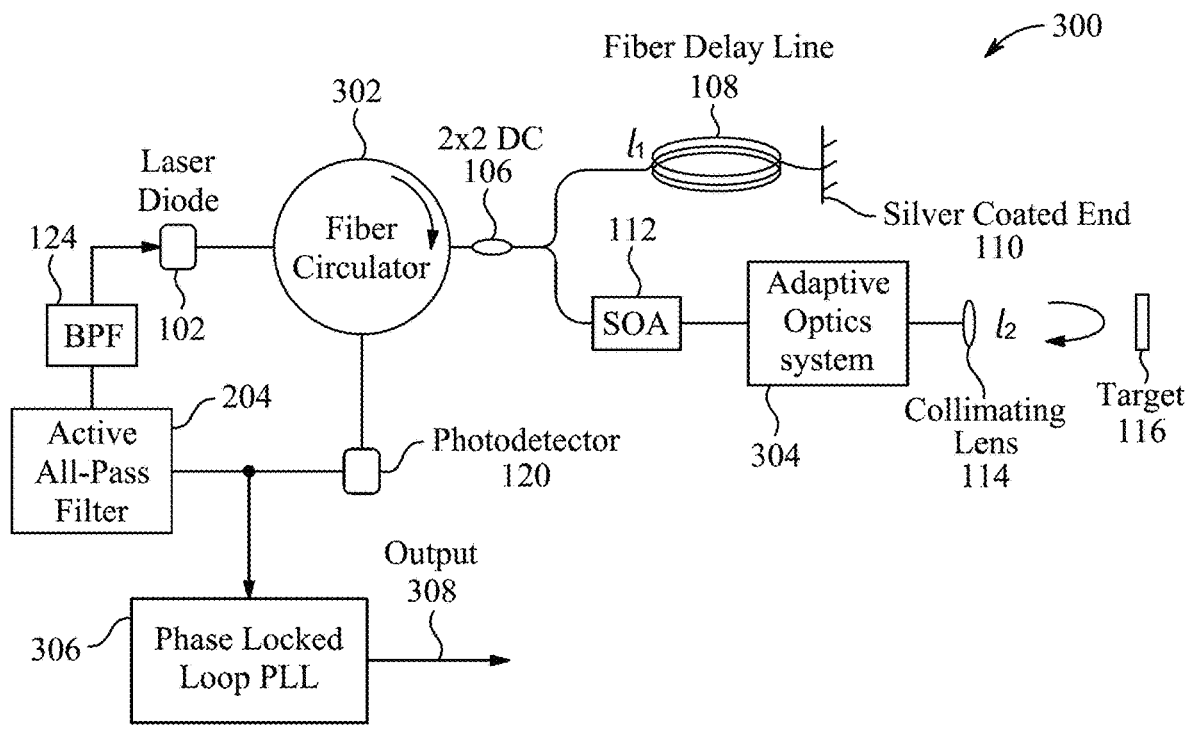
FIG. 3A is an exemplary block diagram depicting an advanced configuration of an ultraprecision frequency-domain LiDAR system using an adaptive optics system, according to certain embodiments.

Referring now to FIG. 3A, the present disclosure provides an exemplary block diagram 300 depicting an advanced configuration of the ultraprecision frequency-domain LiDAR system using an adaptive optics system. The adaptive optics system is used to mitigate atmospheric effects on a laser beam, i.e., the coherent light source. As depicted via the exemplary block diagram 300, the advanced configuration of the ultraprecision frequency-domain LiDAR system includes a fiber circulator 302 connected to the laser diode 102. The fiber circulator 302 is configured to minimize back reflections and back-scattering. In particular, the fiber circulator 302 is also introduced to prevent optical feedback from returning to the laser diode 102, safeguarding the performance and the stability of the laser diode 102.

As depicted via the exemplary block diagram 300, the fiber circulator 302 is configured to receive the intensity modulated optical signals, i.e., the coherent light source generated by the laser diode 102 at a first port. The fiber circulator 302 is configured to transmit the intensity modulated optical signals into the 50/50 directional coupler, i.e., the 2×2 DC 106. In addition, the fiber circulator 302 is configured to receive the phase-shifted intensity modulated optical signals and the amplified intensity modulated optical signals at a second port. The fiber circulator 302 transmits the phase-shifted intensity modulated optical signals and the amplified intensity modulated optical signals from a third port to the photodetector 120.

The advanced configuration of the ultraprecision frequency-domain LiDAR system includes an adaptive optics system 304. The adaptive optics system 304 is connected between the SOA 112 and the optical collimator, i.e., the collimating lens 114. The adaptive optics system 304 is configured to mitigate atmospheric turbulence effects on the amplified intensity modulated optical signals in the free-space propagation region. In particular, the adaptive optics system 304 counteracts the effects of atmospheric disturbances on the amplified intensity modulated optical signals, thereby enhancing the amplified intensity modulated optical signals integrity and ensuring more reliable measurements. Examples of the atmospheric disturbances may include thermal turbulence, wind-induced fluctuations, humidity and water vapor, fog or mist, particulate matters (e.g., dust, pollution, etc.), and the like.

Figure 3B:
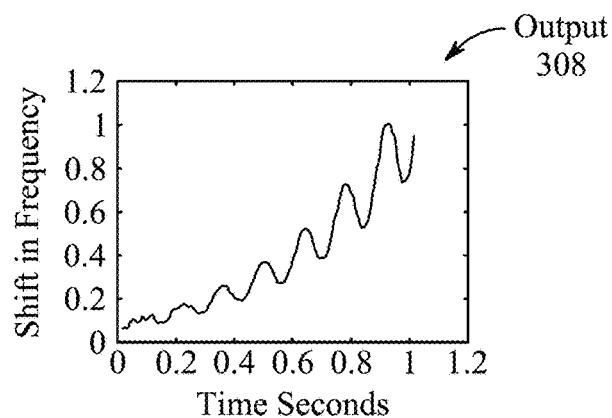
FIG. 3B is an exemplary output from the advanced configuration of an ultraprecision frequency-domain LiDAR system using the adaptive optics system of FIG. 3B, according to certain embodiments.

The advanced configuration of the ultraprecision frequency-domain LiDAR system includes a phase-locked loop (PLL) 306. Instead of the spectrum analyzer 130 or the phase detector 206, the advanced configuration of the ultraprecision frequency-domain LiDAR system includes the PLL 306. In particular, the frequency-domain analyzer is the PLL 306. The PLL 306 is integrated into the ultraprecision frequency-domain LiDAR system to improve the detection of the micro-movements of the target 116 by synchronizing the electrical signals with the reference signal. The electrical signals may be generated by the photodetector 120 by the phase-shifted intensity modulated optical signals and the amplified intensity modulated optical signals. These enhancements depicted by the advanced configuration of the ultraprecision frequency-domain LiDAR system collectively optimize the performance of the ultraprecision frequency-domain LiDAR system, particularly in dynamic and variable environmental conditions. An output 308 is generated by the PLL 306 based on the frequency shifts in the electrical signals induced by the micro-movements of the target 116 (as shown in FIG. 3B).

The ultraprecision frequency-domain LiDAR system includes two phase conditions of oscillations at frequency 'ω'. A first phase condition includes a phase encountered by the intensity modulated optical signals in the two optical paths (optical fiber coil, i.e., the fiber-optic delay line 108) equal in the free-space propagation region (±integer number of 2π). The first phase condition is depicted via an equation 1 below:

$$\frac{2n\omega}{c} l_1 = \frac{2\omega}{c} l_2 \pm 2m\pi \quad (1)$$

A second phase condition includes a total phase shift around a whole loop equal to multiples of 2π. The whole loop refers to a combined optical path, including the first optical path and the second optical path, i.e., a complete path from the laser diode 102 through the Michelson interferometer 104 and fiber optic components, as well as the feedback loop 128 that compensates for any induced phase shifts. The second phase condition is depicted via an equation 2 below:

$$\frac{2n\omega}{c} l_1 + \varphi_e = \pm 2k\pi \quad (2)$$

In the above equation 1 and 2, 'ω' represents the frequency of an intensity modulated optical signal. '$l_1$' and '$l_2$' represents are lengths of an optical fiber coil, i.e., the fiber-optic delay line 108 and a distance between the laser diode 102 and the target 116, as depicted via FIG. 1, FIG. 2A, and FIG. 3A. 'n' represents a refractive index of the optical fiber coil. 'm' and 'k' are integers. '$\varphi_e$' is the initial phase shift caused due to the feedback loop 128. 'c' represents a speed of the intensity modulated optical signal in a vacuum.

An amount of a phase shift change 'δφ' that occurs in the second optical path with the distance '$l_2$', which is caused by the displacement of the target 116 by 'δl' is given by an equation 3 below:

$$\delta\varphi = \frac{2\omega}{c} \delta l \quad (3)$$

This phase variation, i.e., the phase shift change 'δφ' initially causes the ultraprecision frequency-domain LiDAR system to adjust its oscillation frequency, after which the ultraprecision frequency-domain LiDAR system stabilizes at a steady-state oscillation frequency as depicted via an equation 4.

$$\frac{2\omega}{c} \delta l \rightarrow \frac{2(\omega + \delta\omega)}{c} \delta l \quad (4)$$

In the above equation 4, 'δω' represents a change in the angular frequency 'ω'.

The ultraprecision frequency-domain LiDAR system phase conditions of the frequency oscillations described by equations 1 and 2 will vary according to equations 5 and 6.

$$\frac{2n(\omega + \delta\omega)}{c} l_1 = \frac{2(\omega + \delta\omega)}{c} l_2 + \delta\varphi \pm 2m\pi \quad (5)$$

$$\frac{2n(\omega + \delta\omega)}{c} l_1 + \varphi_e + \delta\varphi_e = \pm 2k\pi \quad (6)$$

In the above equations 5 and 6, '$\varphi_e$' represents an initial phase shift caused due to the feedback loop 128 of the ultraprecision frequency-domain LiDAR system. '$\delta\varphi_e$' represents an amount of change in the initial phase shift of the feedback loop 128.

By subtracting equations 1 and 2 from equations 5 and 6 respectively, equation 7 and 8 are obtained.

$$\frac{2n\delta\omega}{c} l_1 = \frac{2\delta\omega}{c} l_2 + \delta\varphi \quad (7)$$

$$\frac{2n\delta\omega}{c} l_1 + \delta\varphi_e = 0 \quad (8)$$

The above equation 7 describes how the change in the frequency 'δω' introduced by the target's displacement (which causes the change in the phase shift 'δφ') affects the ultraprecision frequency-domain LiDAR system's phase balance. The equation 8 describes an impact of the feedback loop 128 on the phase shift change 'δφ' in the ultraprecision frequency-domain LiDAR system.

From the equations 7 and 8, an equation 9 is obtained.

$$\delta\omega = \frac{c\delta\varphi}{2(nl_1 - l_2)} = \frac{-c\delta\varphi_e}{2nl_1} \quad (9)$$

The above-equation 9 is used to determine how the ultraprecision frequency-domain LiDAR system detects tiny movements, i.e., the micro-movements of the target 116 by relating the tiny movements to changes in the oscillation frequency.

From the equation 9 for $\delta\varphi_e << \delta\varphi$, it is observed that, $l_2 >> 2n\, l_1$. On the other hand, $l_1$ is much greater than an RF wavelength which is written as $l_1 >> \lambda_{RF}$. In this case, equation 9 is written in a form as depicted via equation 10 below.

$$\delta\omega \cong \frac{-c\delta\varphi}{2l_2} = \frac{-\omega\delta l}{l_2} \quad (10)$$

Figure 4:
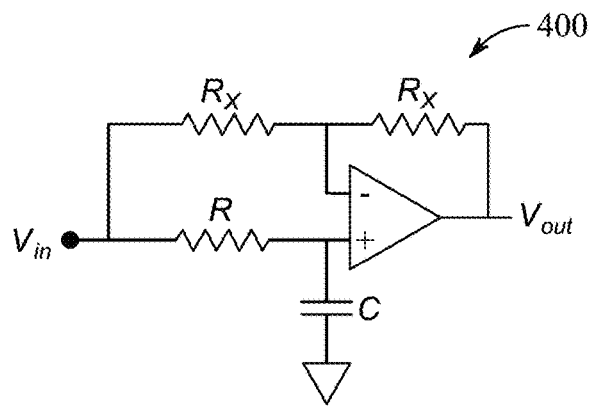
FIG. 4 is an exemplary circuit diagram of an active all-pass filter used in a feedback loop, according to certain embodiments.

Referring now to FIG. 4, the present disclosure provides an exemplary circuit diagram 400 of an active all-pass filter used in a feedback loop. With reference to FIG. 2A, the active all-pass filter may correspond to the active all-pass filter 204 and the feedback loop may correspond to the feedback loop 128. The active all-pass filter produces the unity gain across all frequencies and introduces the phase shifts dependent on resistance (R and Rx) and capacitance (C) values. The circuit diagram 400 shown in the FIG. 4 is representative of a variable phase shifter (e.g., the PZT fiber stretcher 118) with a unity gain and a phase shift given as depicted via an equation 11 below $$\varphi_e = -2 \tan^{-1}(\omega RC) \ldots \quad (11)$$

In the above equation 11, '$\varphi_e$' represents the initial phase shift introduced by the variable phase shifter (measured in radians). 'ω' represents the angular frequency of an RF voltage signal. 'R' represents a resistance value (measured in ohms (Ω)) of a resistor in a phase shifting circuit (represented by the PZT fiber stretcher 118 and active all-pass filter 204) and 'C' represents a capacitance value (measured in farads (F)) of a capacitor in the phase shifting circuit.

The initial phase shift '$\varphi_e$' obtained using the above equation 11 is adjusted to achieve oscillations at a desired center frequency, which is determined by a bandpass filter (e.g., the bandpass filter 124). The phase shift relationship, as a function of angular frequency '$\omega$', is obtained using an equation 12.

$$\delta\varphi_e = \frac{-2Rc}{1+(\omega Rc)^2}\delta\omega \tag{12}$$

In the above equation 12, '$\delta\varphi_e$' represents an amount of change in the initial phase shift '$\varphi_e$' occurred due to a small change in the angular frequency '$\omega$'. The '$\delta\varphi_e$' indicates how much the initial phase shift '$\varphi_e$' may vary in response to a small frequency variation, crucial for a precise measurement of the micro-movements of the target 116. '$\delta\omega$' represents a small change (or a small variation) in the angular frequency '$\omega$'. The '$\delta\omega$' represents an amount of frequency variation that is being analyzed in the ultraprecision frequency-domain LiDAR system. To account for the micro-movements of the target 116, the ultraprecision frequency-domain LiDAR system parameters (e.g., fiber-optic delay line characteristics, laser diode output characteristics, etc.) are designed in such a way that the change in the initial phase shift is negligible compared to the phase shift that occurs in the measurement arm (i.e., the first optical path) and the reference arm (i.e., the second optical path) of the Michelson interferometer 104.

Figure 5:
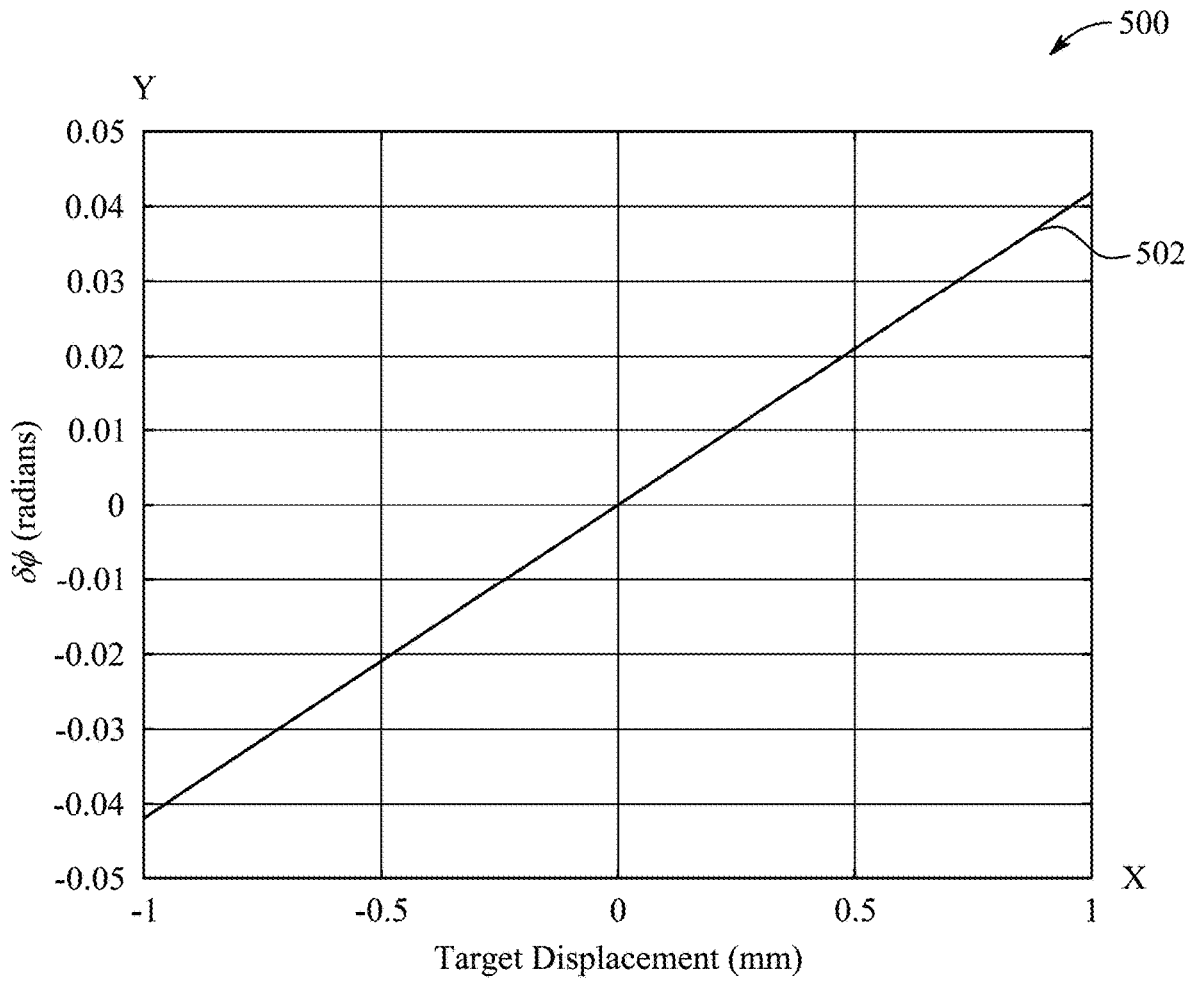
FIG. 5 is an exemplary graph showing a relationship between a phase shift induced in an optical path and small displacements of a target, according to certain embodiments.

Referring now to FIG. 5, the present disclosure provides an exemplary graph 500 showing a relationship between a phase shift induced in an optical path and small displacements of a target (e.g., the target 116). In particular, the graph 500 shows curve 502 that represents the amount of the phase shift that is caused by a small movement (i.e., the micro-movement) of the target 116. This phase shift, as expected is small, but the ultraprecision frequency-domain LiDAR system is used to produce a significant change in the oscillation frequency to render the phase shift sensitive to these small displacements. As depicted via the graph 500, an X-axis of the graph 500 represents a movement of the target (i.e., target displacement) in millimeter (mm). A Y-axis of the graph 500 represents the phase shift change '$\delta\varphi$' that occurred in the optical path (e.g., the second optical path).

The curve 502 in the graph 500 indicates that there is a linear relationship between the displacement of the target and the phase shift change '$\delta\varphi$'. As the target moves (even by small amounts), the phase shift change '$\delta\varphi$' is predictable. A slope of the straight line indicates the ultraprecision frequency-domain LiDAR system's sensitivity to the displacements of the target. In particular, the straight line (represented by the curve 502) indicates that the ultraprecision frequency-domain LiDAR system can consistently detect small target movements by measuring a resulting change in the phase shift '$\delta\varphi$' which is then converted into changes in the frequency, allowing for accurate detection and quantification of the displacements of the target. As seen in FIG. 5, small movements of the target in the millimeter range can be detected by the linear relationship between the phase shift in the detected signal and the target displacement. These displacements can be as small as plus or minus 0.5 mm.

Figure 6:
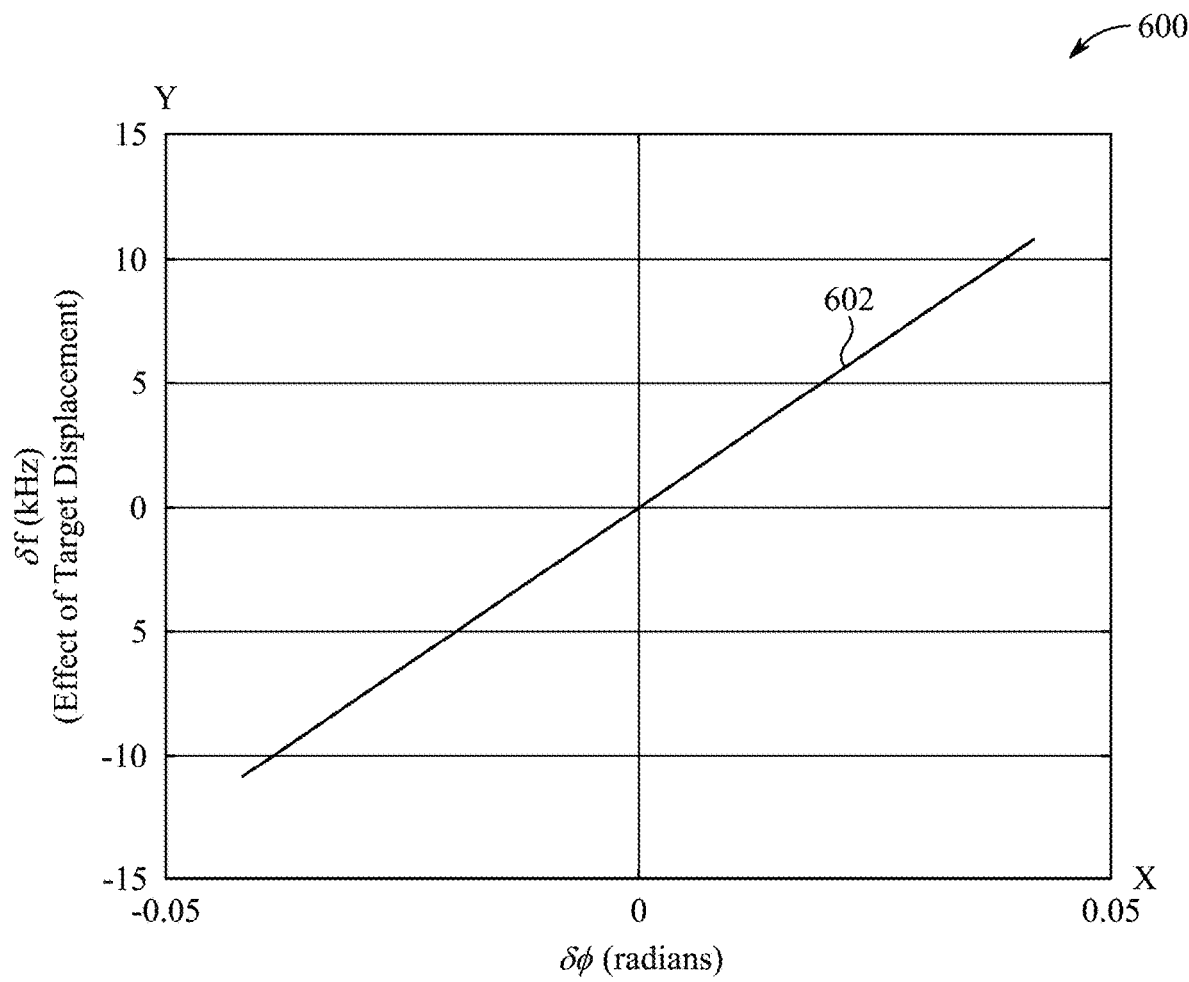
FIG. 6 is an exemplary graphical plot demonstrating a frequency drift in an oscillator caused by a phase shift resulting from a displacement of a target, according to certain embodiments.

Referring now to FIG. 6, the present disclosure provides an exemplary graphical plot 600 demonstrating a frequency drift in an oscillator caused by a phase shift resulting from a displacement of the target. As depicted via the graph 600, an X-axis represents an amount of the phase shift change '$\delta\varphi$' occurred due the movement of the target (e.g., the target 116). A Y-axis represents the frequency drift, i.e., '$\delta f$' (in kilohertz (kHz)) in the oscillator (i.e., the opto-electronic oscillator) caused by the phase shift change '$\delta\varphi$' resulting from the target's displacement. The Y-axis represents the effects of the displacement of the target. The graph 600 is generated for a scenario where the target is positioned 100 meters (m) away from the ultraprecision frequency-domain LiDAR system, and the reference arm (i.e., the second optical path) has a length of 5 m.

The graph 600 demonstrates how the frequency of the oscillator drifts in response to the phase shifts induced by the movement of the target, considering the relative distances involved in the measurement setup. A curve 602 in the graph 600 represents a linear relationship between the phase shift change '$\delta\varphi$' and the frequency drift '$\delta f$' in the oscillator caused by the target's movements. The curve 602 indicates that, as the phase shift change '$\delta\varphi$' increases (due to the target's movement), the frequency drift '$\delta f$' in the oscillator also increases in a proportional manner, which is accurately predicted and quantified by the ultraprecision frequency-domain LiDAR system.

In particular, the graph 600 illustrates how the ultraprecision frequency-domain LiDAR system responds to the change in the phase by adjusting its oscillation frequency. The resulting frequency drift '$\delta f$' is substantial and can be accurately measured using a PLL (e.g., the PLL 306). The electronic feedback mechanism plays a crucial role in compensating for this deviation in an operating frequency. Through the feedback loop (e.g., the feedback loop 128), the ultraprecision frequency-domain LiDAR system continuously adjusts and stabilizes its frequency, ensuring that the ultraprecision frequency-domain LiDAR system remains synchronized with the reference signal and accurately tracks the target's movements.

Figure 7:
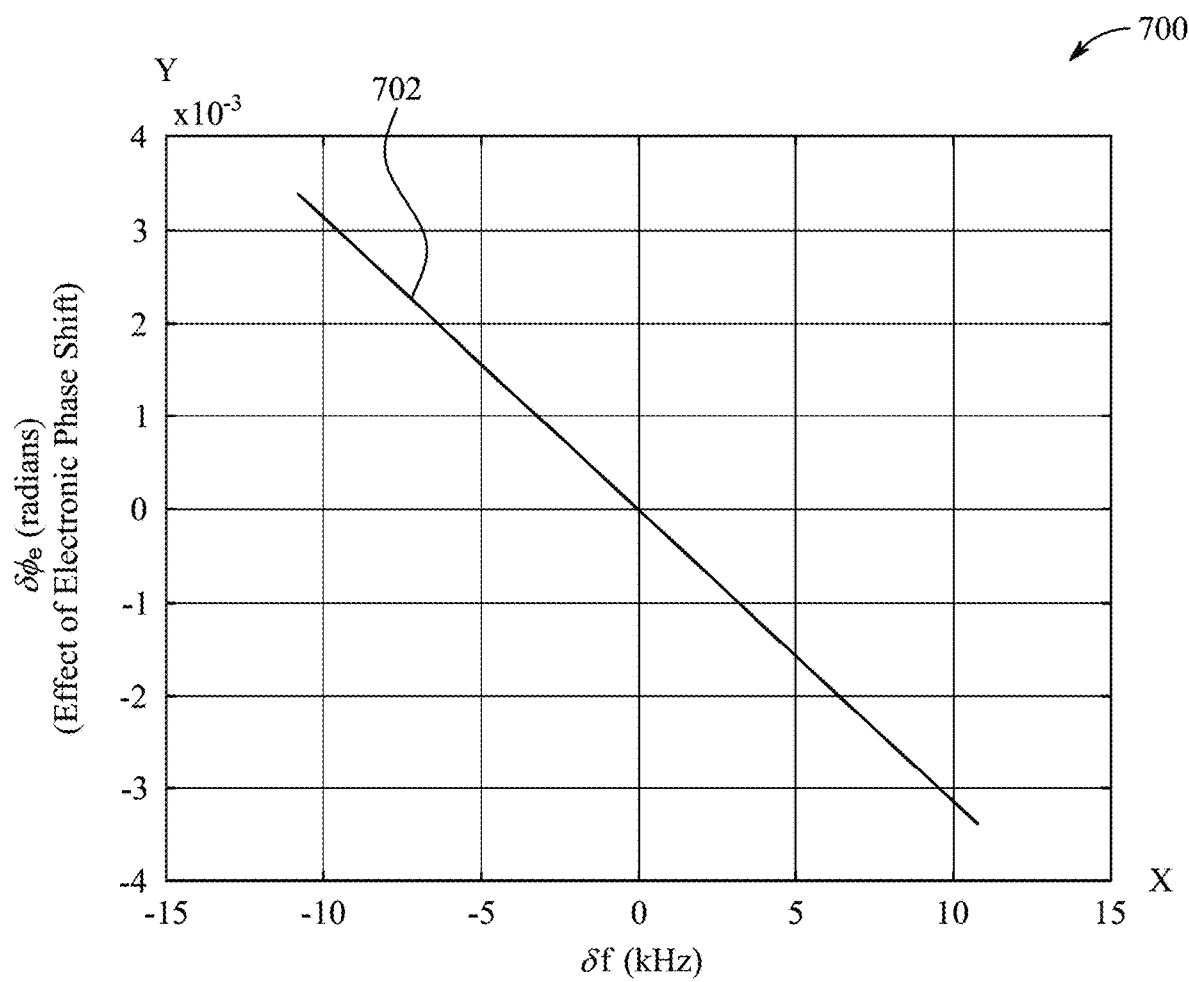
FIG. 7 is an exemplary graph illustrating a change in a phase shift corresponding to a frequency drift, according to certain embodiments.

Referring now to FIG. 7, the present disclosure provides an exemplary graph 700 illustrating a change in a phase shift corresponding to a frequency drift. FIG. 7 is described in conjunction with FIG. 6. The phase shift is also referred to as an electronic phase shift. An X-axis of the graph 700 shows the frequency drift '$\delta f$' (in kHz). A Y-axis of the graph 700 an amount of the change in the initial phase shift, i.e., '$\delta\varphi_e$' (in radians) of the feedback loop (also referred to as an electronic feedback circuit). In particular, a curve 702 in the graph 700 illustrates a linear relationship (as depicted via a straight line) between the change in the phase shift, i.e., '$\delta\varphi_e$' and a corresponding frequency drift '$\delta f$' (e.g., the frequency drift '$\delta f$' shown in FIG. 6). The ultraprecision frequency-domain LiDAR system is designed to ensure that the phase shift induced by the optical fiber coil (e.g., the fiber-optic delay line 108) is a dominant factor, surpassing any phase shift introduced by electronic components (e.g., the SOA 112, the photodetector 120, etc.) of the ultraprecision frequency-domain LiDAR system. This design of the ultraprecision frequency-domain LiDAR system enhances the overall stability of the ultraprecision frequency-domain LiDAR system, ensuring more accurate and reliable frequency tracking.

In particular, the curve 702 demonstrates the change in the phase shift '$\delta\varphi_e$' corresponding to the observed change in the oscillation frequency, i.e., the corresponding frequency drift '$\delta f$'. It is evident from the graph 700 that the change in the phase shift '$\delta\varphi_e$' is negligible compared to any phase shift induced by the optical fiber coil. This design ensures greater stability of ultraprecision frequency-domain LiDAR system, as the ultraprecision frequency-domain LiDAR system relies on the phase shift produced by the optical fiber coil rather than the electronic components. To further validate that the phase shift introduced by the electronic components can be neglected for the given frequency drift '$\delta f$' using the equation 10 with a resistance-capacitance (RC) product of $$\frac{10^{-9}}{2\pi}S$$

at a center frequency of 1 GHz.

Figure 8:
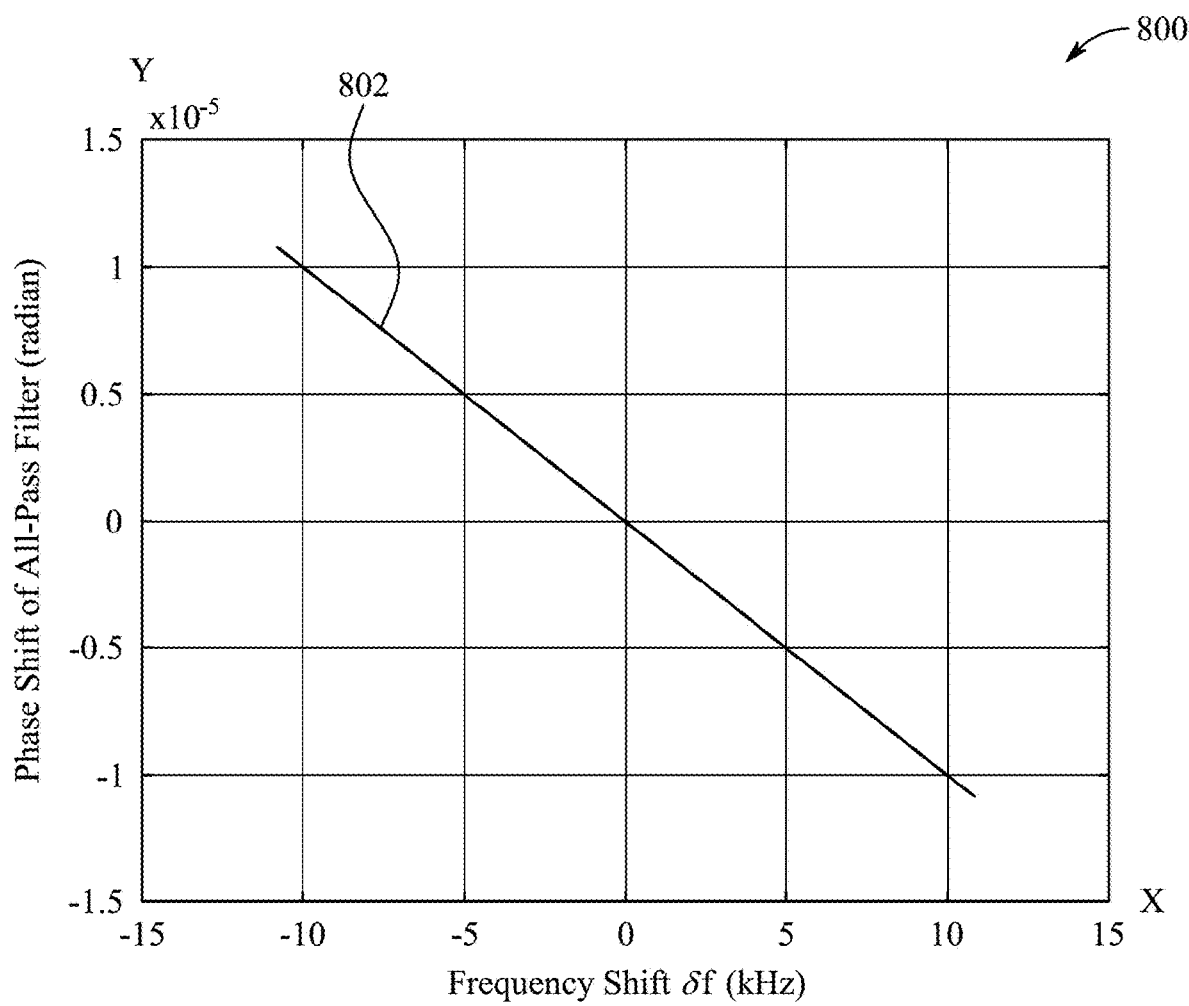
FIG. 8 is an exemplary graph illustrating an amount of a phase shift produced by an active all-pass filter corresponding to frequency shift values, according to certain embodiments.

Referring now to FIG. 8, the present disclosure provides an exemplary graph 800 illustrating an amount of a phase shift produced by an active all-pass filter corresponding to frequency shift values. In the graph 800, an X-axis represents the frequency drift '$\delta f$' (in kHz). The frequency drift '$\delta f$' is also referred to as the frequency shift of the frequency deviation. A Y-axis represents the phase shift change '$\varphi_e$' of the active all-pass filter (e.g., the active all-pass filter 204). In particular, a curve 802 of the graph 800 demonstrates that the phase shift change '$\varphi_e$' introduced by the active all-pass filter is negligible in comparison to the phase shift change '$\varphi_e$' generated by the optical fiber coil. The curve 802 in the graph 800 represents a linear relationship between the frequency drift '$\delta f$' and a corresponding phase shift change '$\varphi_e$' introduced by the active all-pass filter. This indicates that as the frequency drift '$\delta f$' increases, the phase shift change '$\varphi_e$' produced by the active all-pass filter increases in a proportional manner.

The graphs in FIG. 9 and FIG. 10 show individual instances of frequency deviation measured at each discrete position of the target. Each subgraph represents the spectrum of frequency deviation at a specific fixed target position. The X-axis (Frequency Deviation in kHz) shows the deviation from the central frequency which is 1 GHz, while the Y-axis (Signal Amplitude in dBm) indicates the corresponding signal strength.

Referring now to FIG. 9, an exemplary diagram 900 illustrating frequency deviation measurements with a target movement in steps in one direction acquired using a spectrum analyzer (i.e., the spectrum analyzer 130) is provided. The measured frequency deviation is a function of target displacement. The target (a reflective mirror) was mounted on a high-precision translational micrometer stage and sequentially positioned at discrete steps in the same direction farther from the laser. At each fixed position, measurements were taken using an RF spectrum analyzer before manually moving the mirror to the next position and repeating the process. The resulting drift in the system's oscillation frequency aligns with theoretical predictions from Equation (9), demonstrating the system's sensitivity to minute displacements in a remote sensing scenario. In particular, each graph in the exemplary diagram 900 illustrates a frequency deviation observed when a target (e.g., the target 116) is moved in an incremental step away from the laser. An X-axis of each graph represents the frequency deviation (also referred to as the frequency shifts or the frequency drift '$\delta f$') in kHz. A Y-axis of each graph represents a signal amplitude (measured in decibel milliwatt (dBm)). The frequency deviation corresponds to shifts in the oscillation frequency, i.e., the frequency drift '$\delta f$' of the ultraprecision frequency-domain LiDAR system caused due to the micro-movements of the target. These micro-movements of the target induce small phase shifts in the ultraprecision frequency-domain LiDAR system, which in turn lead to corresponding changes in the frequency of the opto-electronic oscillator used in the ultraprecision frequency-domain LiDAR system.

As depicted via each graph in the FIG. 9, the frequency drift '$\delta f$' caused by the target moving in the direction away from the laser is a negative frequency drift. For example, a first graph of a third row represents the negative frequency drift of −10 kHz when the target moves in back. The frequency deviation measurements shown in the FIG. 9 are obtained using the spectrum analyzer (e.g., the spectrum analyzer 130). The spectrum analyzer is a tool that analyzes the frequency content of the electrical signals and can detect shifts in frequency, i.e., the frequency drift '$\delta f$' as small as those caused by the micro-movements of the target. The spectrum analyzer records the deviation in the frequency of the electrical signals generated by the opto-electronic oscillator, which is directly related to the displacements caused due to micro-movements of the target.

The micro-movements of the target results in a measurable frequency change, i.e., the frequency drift '$\delta f$', which is plotted in each graph as a function of the target's position. In particular, each graph in the FIG. 9 demonstrates how the frequency of the electrical signals deviates as the target moves, allowing for precise tracking of small target displacements. This data, i.e., data demonstrating the deviation in the frequency of the electrical signals that is obtained based on the micro-movements of the target can be used iteratively to enhance an accuracy of the ultraprecision frequency-domain LiDAR system, allowing the ultraprecision frequency-domain LiDAR system to detect and measure even the minor movements of the target with high precision.

Referring now to FIG. 10, the present disclosure provides an exemplary diagram 1000 illustrating frequency deviation measurements with a target movement in steps in towards the laser. In particular, each graph in the FIG. 10 represents the frequency deviation measurements obtained based on the movement of the target (e.g., the target 116) in discrete steps in an opposite direction (e.g., towards the laser). The reflective mirror, mounted on a high-precision translational micrometer stage, was manually repositioned step by step, with measurements taken at each fixed position using an RF spectrum analyzer. The observed frequency shift closely follows the theoretical predictions from Equation (9), further demonstrating the system's capability to detect minute displacements in a remote sensing configuration. In the FIG. 10, an X-axis of each graph represents the deviation (also referred to as the frequency shifts or the frequency drift '$\delta f$') from a central frequency in kHz. The Y-axis of each graph represents a corresponding signal strength (amplitude) measured in dBm. The frequency deviation measurements shown in the FIG. 10 are obtained using the spectrum analyzer (e.g., the spectrum analyzer 130). As depicted via each graph in the FIG. 10, the frequency drift '$\delta f$' caused by the movement of the target in the forward direction is a positive frequency drift. For example, a first graph of a third row represents the positive frequency drift of +10 kHz when the target moves in the forward direction.

Figure 11:
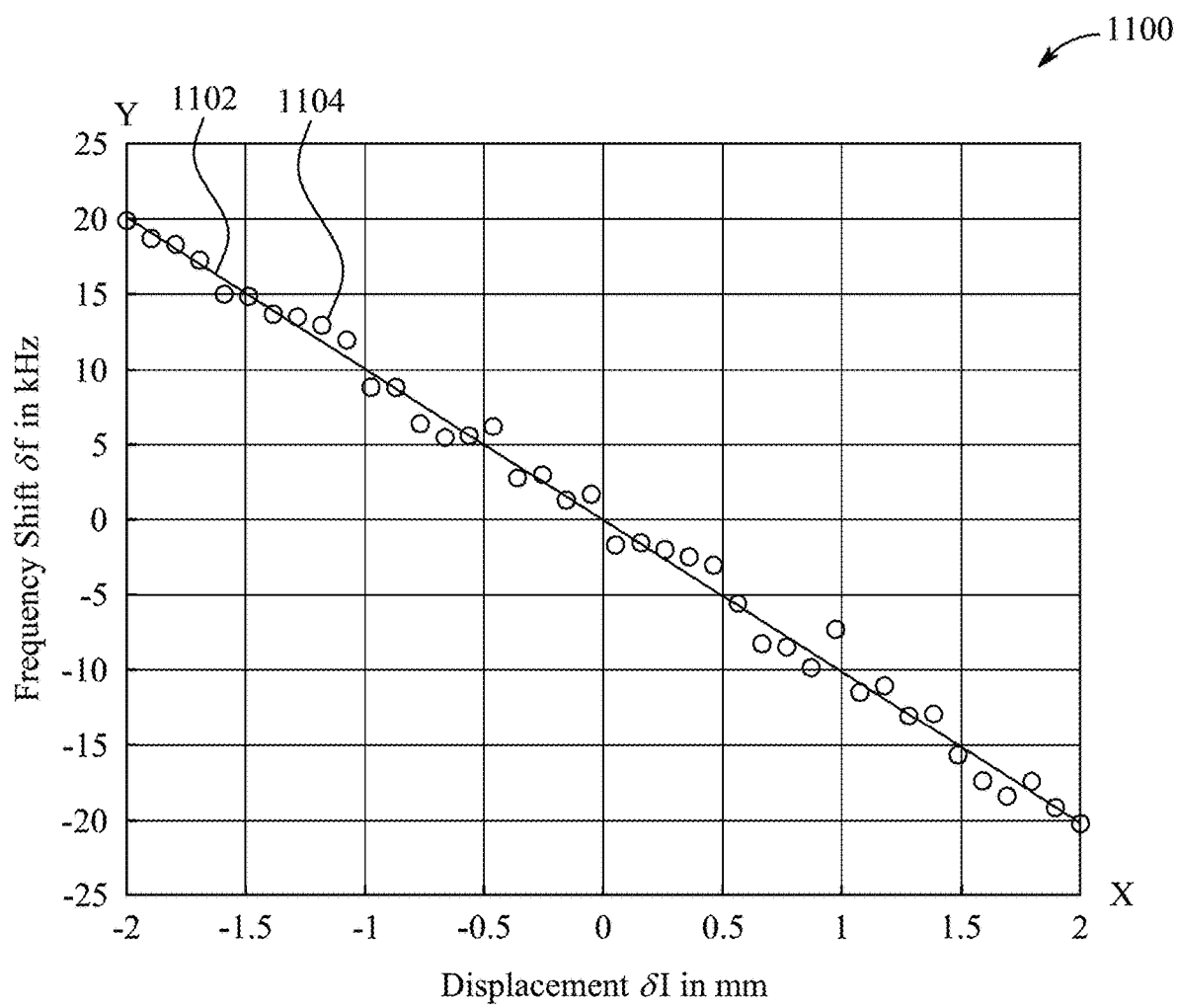
FIG. 11 is an exemplary graphical plot illustrating a frequency deviation with a target movement and a best fit linear relation, according to certain embodiments.

Referring now to FIG. 11, the present disclosure provides an exemplary graphical plot 1100 illustrating a frequency deviation with a target movement and a best fit linear relation. In the graphical plot 1100, an X-axis represents a target displacement '$\delta l$' (measure in mm). A Y-axis represents the frequency drift '$\delta f$' (also referred to as the frequency shift) in kHz, caused by the movement of the target. A curve 1102 represented by straight line in the graphical plot 1100 represents a linear fit or a best-fit linear relation that models a relationship between the target displacement 'δl' and the frequency drift 'δf'.

This linear relationship represented via the straight line (1102) suggests that the frequency drift 'δf' (represented on the Y-axis) changes in a proportional manner with respect to the target displacement 'δl' (represented on the X-axis). Circles 1104 associated with the straight line represent actual measurement data points acquired during the ultraprecision frequency-domain LiDAR system operation. Each circle 1104 corresponds to a specific measurement of the target displacement 'δl' and its associated frequency drift 'δf'. These measurement data points are observed values of the frequency drift 'δf' and the target displacement 'δl', plotted as discrete circular points on the graphical plot 1100. The circles that lie directly on the straight line represent ideal measurement data points that exactly follow the linear relationship between the target displacement 'δl' and the frequency drift 'δf'. These measurement data points represented by the circles on the straight line are consistent with an expected behavior of the ultraprecision frequency-domain LiDAR system, where the frequency drift 'δf' changes proportionally with the target displacement 'δl'. Furthermore, circles that are situated away from the straight line represent measurement points with deviations from the ideal linear relationship. These circles indicate some degree of error or noise in the measurement data points, which could be due to various factors, such as measurement noise or system imperfections, environmental factors, etc. It can be noted that the displacement of the target can be accurately measured for small displacements of less that 0.5 mm (equivalently 500 microns).

Figure 12:
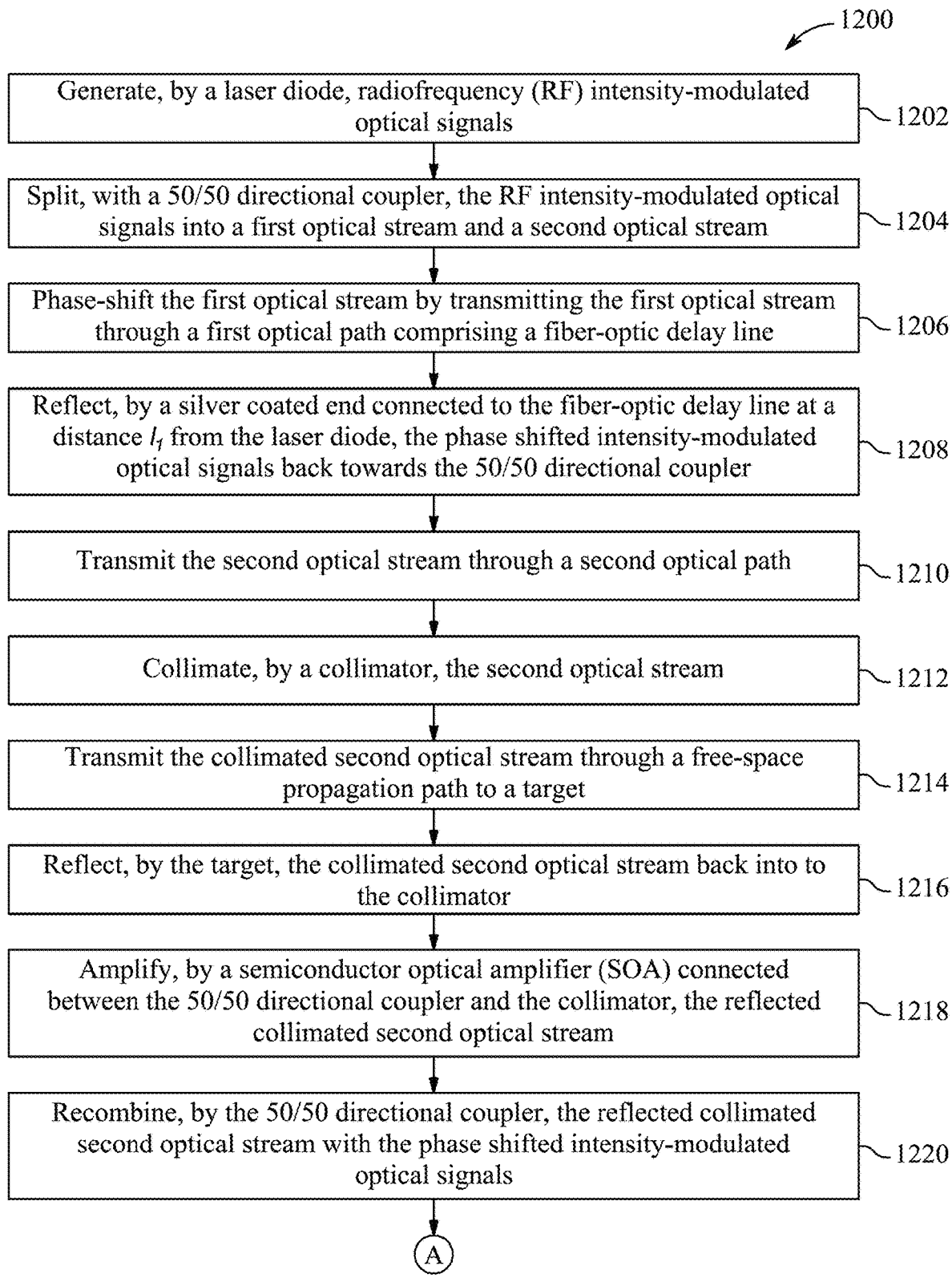
FIG. 12 is an exemplary diagram of a method for detecting micro-movements of a target with an ultraprecision frequency-domain LiDAR system, according to certain embodiments.
Figure 12:
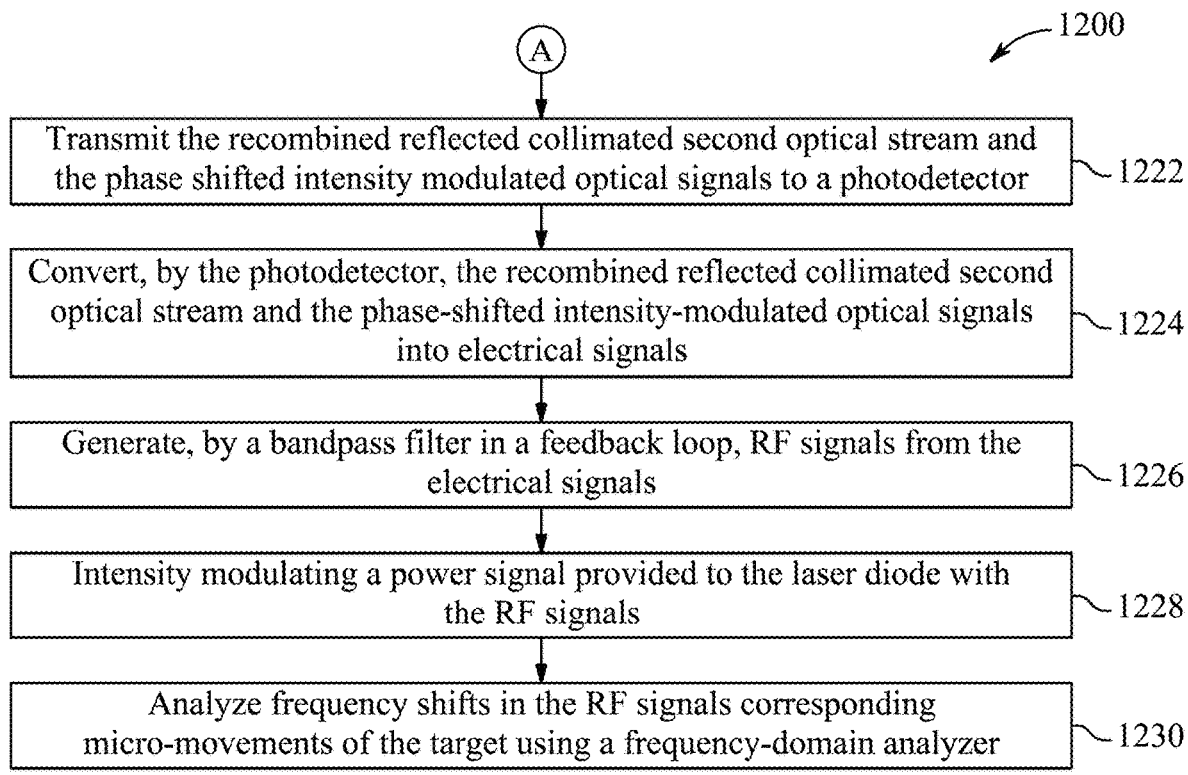

Referring now to FIG. 12, the present disclosure provides an exemplary diagram of a method 1200 for detecting micro-movements of a target with an ultraprecision frequency-domain LiDAR system. The target may correspond to the target 116. Examples of the target may include the structural element (e.g., the bridge, the building, or the dam) where the micro-movements caused due to wind, traffic, or seismic activity need to be monitored for structural health, the machinery or the equipment (e.g., the industrial machinery, the turbine, or the engine) where minute vibrations might indicate early signs of wear or malfunction, the biological system (e.g., the human body or the animal body) for monitoring small movements such as heartbeats, tremors, or other biological signals, the geological feature (e.g., the areas near active faults, volcanic zones, or earthquake-prone regions) where minute shifts in the earth's surface are crucial for early warning system, and the like.

In order to detect the micro-movements of the target, at step 1202, RF intensity modulated optical signals may be generated by a laser diode (e.g., the laser diode 102). The laser diode is connected to the power source. The RF intensity modulated optical signal may also be referred to as the intensity modulated optical signals, the coherent light source, or the laser beam. A light source, i.e., an RF intensity modulated optical signal consists of a pigtail laser diode, which is intensity-modulated at a precise RF frequency specified by a bandpass filter (e.g., the bandpass filter 124). This modulation encodes the RF signal onto the light source, enabling the ultraprecision frequency-domain LiDAR system to achieve high sensitivity in detecting minute micro-movements of the target. In particular, in order to generate the RF intensity modulated optical signals, the bandpass filter is configured to modulate a power provided by the power source using the RF signal. The modulated power causes the laser diode to generate intensity modulated optical signals.

As the intensity-modulated optical signals are generated, at step 1204, the RF intensity-modulated optical signals are split into the first optical stream and the second optical stream using the 50/50 directional coupler (e.g., 2×2 DC 106). The 50/50 directional coupler is an optical device that is used to split the intensity-modulated optical signals (also referred to as the coherent light source) into two equal intensity optical paths. At step 1206, the first optical stream is phase-shifted by transmitting the first optical stream through the first optical path including a fiber-optic delay line. The fiber-optic delay line may correspond to the fiber-optic delay line 108. The inclusion of the fiber-optic delay line increases a phase sensitivity of ultraprecision frequency-domain LiDAR system. The fiber-optic delay line allows for precise detection of minute micro-movements variations even at a remote distance. The first optical path may also be referred to as the measurement arm. The initial phase shift is introduced on the first optical path using the PZT fiber stretcher (e.g., the PZT fiber stretcher 118) connected between the 50/50 directional coupler and the fiber optic delay line.

At step 1208, the phase shifted intensity modulated optical signals are reflected back towards the 50/50 directional coupler by the silver coated end connected to the fiber-optic delay line at the distance $l_1$ from the laser diode. The silver coated end may correspond to the silver coated end 110. At step 1210, the second optical stream is transmitted through the second optical path. The second optical path may also be referred to as the reference arm. Upon transmission, at step 1212, the second optical stream is collimated using the optical collimator (e.g., the collimating lens 114). Once the second optical stream is collimated, at step 1214, the collimated second optical stream is transmitted through the free-space propagation path to the target. At step 1216, the collimated second optical stream is reflected back by the target into the optical collimator. Upon reflecting back the collimated second optical stream, at step 1218, the reflected collimated second optical stream is amplified by the SOA (e.g., the SOA 112). The SOA is connected between the 50/50 directional coupler and the optical collimator. In particular, the SOA is configured to amplify the reflected collimated second optical stream (also referred to as the intensity modulated optical signals) on the second optical path to compensate for signal losses. The SOA compensates for optical losses, i.e., the signal losses and ensures a strong enough modulated signals (i.e., the amplified reflected collimated second optical stream) is delivered to the free-space propagation region and in other direction towards the feedback loop (e.g., the feedback loop 128).

At step 1220, the reflected collimated second optical stream (also referred to as the amplified intensity modulated optical signals) is recombined with the phase shifted intensity modulated optical signals using the 50/50 directional coupler. Upon recombining, at step 1222, the recombined reflected collimated second optical stream and the phase shifted intensity modulated optical signals is transmitted to the photodetector (e.g., the photodetector 120). At step 1224, the recombined reflected collimated second optical stream and the phase shifted intensity modulated optical signals are converted into electrical signals using the photodetector. Upon conversion, at step 1226, the RF signals are generated from the electrical signals. The RF signals are generated by the bandpass filter in the feedback loop. Once the RF signals are generated, at step 1228, a power signal is provided to the laser diode to intensity modulated with the RF signals. At step 1230, the frequency shifts in the RF signals corresponding micro-movements of the target are analyzed using the frequency-domain analyzer. The frequency-domain analyzer is one of the spectrum analyzers (e.g., the spectrum analyzer 130), the phase detector (e.g., the phase detector 206), and the PLL (e.g., the PLL 306).

When the frequency-domain analyzer is the spectrum analyzer, the electrical signals are transformed by the transimpedance amplifier (e.g., the transimpedance amplifier 122) to RF voltage signals. In the ultraprecision frequency-domain LiDAR system including the spectrum analyzer (i.e., the basic configuration shown in FIG. 1), the transimpedance amplifier is connected between the photodetector and the bandpass filter. Once the electrical signals are transformed in the RF signals, i.e., the RF voltage signals, the RF voltage signals is synchronized with the reference signal. The reference signal is a stable and known signal used as a benchmark for comparison. The reference signal helps synchronize and compare an output of the ultraprecision frequency-domain LiDAR system, ensuring accurate measurement and detection of changes, such as the phase shifts or the frequency shifts (also referred to as the frequency deviation or the frequency drift).

When a second configuration (i.e., another configuration shown in FIG. 2A) of the ultraprecision frequency-domain LiDAR system including the active all-pass clear filter (e.g., the active all-pass filter 204) is implemented, then the transimpedance amplifier integrated with the photodetector (i.e., the photodetector with the transimpedance amplifier 202) is used to transform the electrical signals to the RF voltage signals. By using the active all-pass clear filter, the RF voltage signals are phase shifted. In conjunction with FIG. 2A, as depicted via the exemplary block diagram 200, the active all-pass filter is connected between the transimpedance amplifier (i.e., the photodetector with the transimpedance amplifier 202) and the bandpass filter. The phase-shifted RF voltage signals are transformed using the active all-pass clear filter to have unity gain across all frequencies of the phase-shifted RF voltage signals. Once the phase-shifted RF voltage signals are transformed, at the reference signal input port integrated with the phase detector, the reference signal is received. Upon receiving the reference signal, the frequency drift is reduced by the phase detector by comparing the phase-shifted RF voltage signals having the unity gain to the reference signal.

When a third configuration (i.e., the advanced configuration shown in FIG. 3A) of the ultraprecision frequency-domain LiDAR system including the PLL (e.g., the PLL 306) is implemented, then at the first port of the fiber circulator (e.g., the fiber circulator 302) that is connected to the laser diode is configured to receive the RF intensity modulated optical signals generated by the laser diode. The fiber circulator is configured to minimize back reflections and back-scattering between the laser diode and the 50/50 directional coupler and between the 50/50 directional coupler and the photodetector. At the second port of the fiber circulator, the RF intensity modulated optical signals is transmitted into the 50/50 directional coupler. In response to transmitting the RF intensity modulated optical signals, the phase shifted intensity modulated optical signals and the reflected collimated second optical stream (i.e., the amplified intensity modulated optical signals) are received at the second port from the 50/50 directional coupler. The phase shifted intensity modulated optical signals and the reflected collimated second optical stream are transmitted from the third port of the fiber circulator to the photodetector. Additionally, using the adaptive optics system (e.g., the adaptive optics system 304) that is connected between the SOA and the optical collimator, is configured to mitigate the atmospheric turbulence effects on the reflected collimated second optical stream in the free-space propagation region. The electrical signals are phase-shifted with the unity gain using the active all-pass filter connected between the bandpass filter and the photodetector. The phase-shifted electrical signals are transmitted to the bandpass filter. In addition, the phase-shifted electrical signals are transmitted to the PLL.

The ultraprecision frequency-domain LiDAR system and the method 1200 for remote micro-movement detection of the target offers a novel approach to optical sensing that departs from traditional LiDAR system and optoelectronic oscillator principles. Unlike traditional LiDAR systems that rely on time-of-flight and pulsed signals, this ultraprecision frequency-domain LiDAR system employs frequency-domain analysis of echo received from targets, utilizing intensity modulation of the laser diode with the RF signals defined by the bandpass filter. This modulation enables the detection of minute variations in the displacement or the vibration of the target, achieving unprecedented sensitivity and precision. The ultraprecision frequency-domain LiDAR system incorporates the Michelson interferometer with both the free-space propagation region and a fiber-guided path, i.e., two optical paths, enhancing an ability of the ultraprecision frequency-domain LiDAR system to detect very small variations in the fiber-guided path. The Michelson interferometer, in conjunction with the optoelectronic oscillator, adjusts the oscillation frequency in response to the phase variations induced by these small displacements of the target. The ultraprecision frequency-domain LiDAR system compensates for the atmospheric effects, ensuring accurate detection of the micro-movements by transforming these phase variations into oscillation frequency drift. The integration of RF intensity-modulated optical signals, advanced fiber-optic components, and the Michelson interferometry creates a compact, robust, and highly sensitive system, making it ideal for real-time detection of microscopic movements in remote or challenging environments. The ultraprecision frequency-domain LiDAR system provides significant advantages for applications in industrial monitoring, medical diagnostics, structural health monitoring, and beyond.

The present disclosure describes a method and a system (i.e., the ultraprecision frequency-domain LiDAR system) for detecting micro-movements of the target (e.g., the structural elements, the machinery or equipment, and the like). The method and system provide enhanced sensitivity and precision by employing a frequency-domain approach and utilizing fiber-optic components, the system achieves ultra-precision remote detection of micro-movements, vibrations, or displacements. The integration of the Michelson interferometer ensures high sensitivity to phase changes induced by an object's motion. The method and system mitigate the atmospheric disturbances by using advanced components such the adaptive optics system, and collimating optics minimizes the impact of the atmospheric disturbances. The method and system provide a compact and a robust design by incorporating fiber-optic technologies that allow the system to remain compact and less susceptible to environmental noise and ambient temperature variations that affect electronic components. The compact and robust design makes the system suitable for deployment in diverse settings, from industrial environments to outdoor applications. The method and the system is suitable for versatile applications and enhances the system's ability to remotely monitor minute variations in movement makes the system ideal for a wide range of applications, including monitoring structural health in civil engineering, detecting micro-vibrations in machinery for early failure detection, non-invasive medical diagnostics for measuring small biological movements (e.g., heartbeats or tremors), enhancing security systems by detecting subtle intrusions, and enabling timely monitoring of geological activity due to the system's ability to detect minute vibrations and movements having significant implications for early detection of volcanic eruptions and earthquakes. The method and the system are cost-effective, as the method and system relies on commercially available fiber-optic components and off-the-shelf signal processing technologies. This approach significantly reduces both the cost and complexity of the system compared to other existing high-precision sensing technologies. In particular, the method and the system provide a transformative solution to the challenges of detecting remote micro-movements in real-world conditions, bridging the gap between ultraprecision sensing and practical deployment. The method and system offer enhanced sensitivity, atmospheric resilience, and versatility, addressing critical shortcomings of existing technologies.

The filters and amplifiers of FIGS. 1, 2A and 3A may be connected to a computing device (not shown in FIGS. 1, 2A and 3A) which is used to program the bandpass filter 124, the phased clock generator 126, the all-pass filter 204, the SOA 112, the PZT fiber stretcher 118, the photodetector 120 and the transimpedance amplifier 122 and to provide drive signals.

Figure 13:
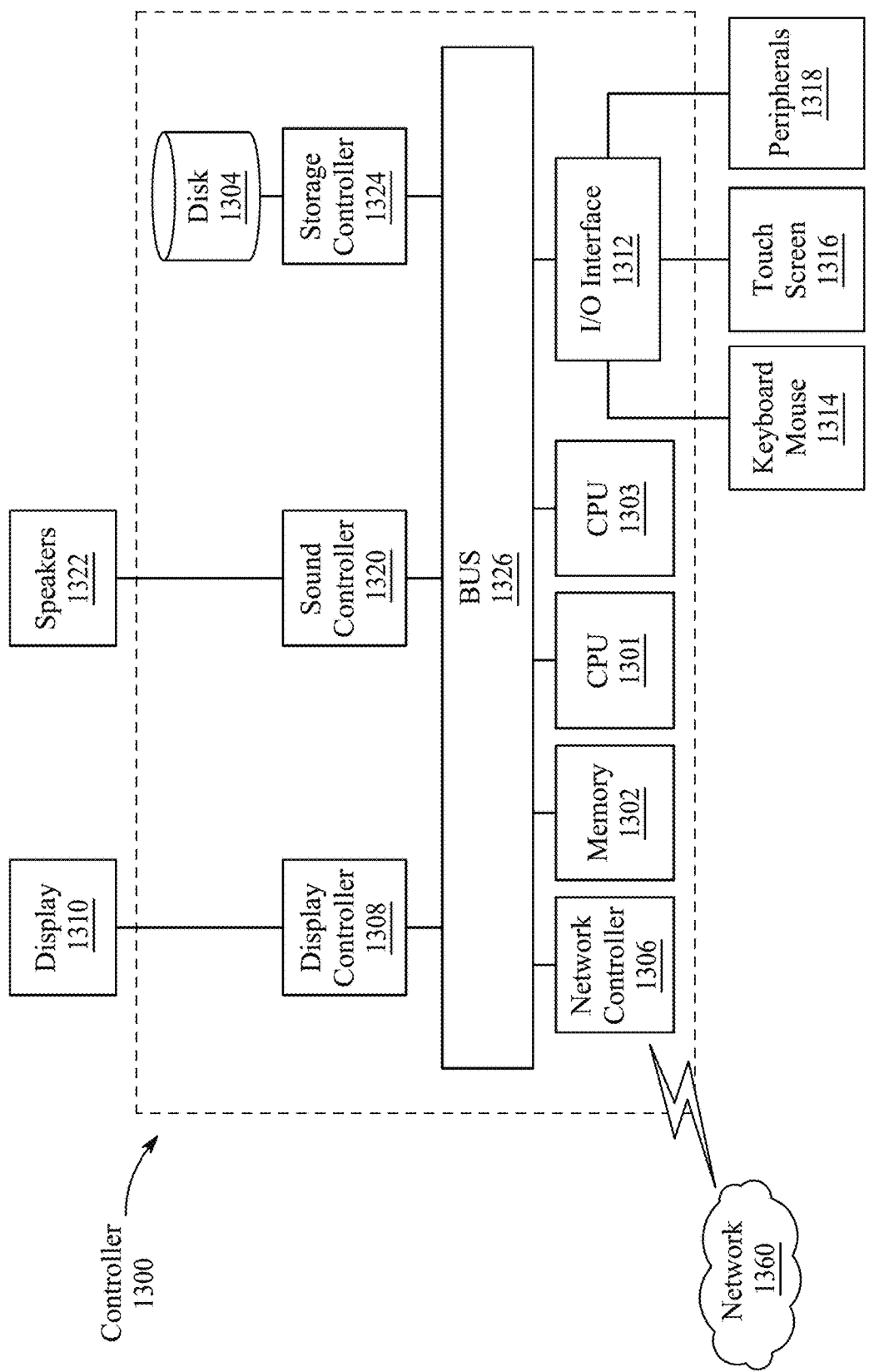
FIG. 13 is an illustration of a non-limiting example of details of computing hardware used in the computing device, according to certain embodiments.

Next, further details of the hardware description of the computing environment according to exemplary embodiments is described with reference to FIG. 13. In FIG. 13, a controller 1300 is described as representative of the computing device in the ultraprecision frequency-domain LiDAR system in which the controller 1300 is a computing device which includes a Central Processing Unit (CPU) 1301 which performs the processes described above/below. The process data and instructions may be stored in a memory 1302. These processes and instructions may also be stored on a storage medium disk 1304 such as a Hard Disk Drive (HDD) or a portable storage medium or may be stored remotely.

The claims are not limited by the form of the computer-readable media on which the instructions of the inventive process are stored. For example, the instructions may be stored on Compact Disks (CDs), Digital Versatile Discs (DVDs), in a Flash memory, a Random Access Memory (RAM), a Read-Only Memory (ROM), a Programmable Read-Only Memory (PROM), an Erasable Programmable Read-Only Memory (EPROM), an Electrically Erasable Programmable Read-Only Memory (EEPROM), a hard disk or any other information processing device with which the computing device communicates, such as a server or a computer.

The claims may be provided as a utility application, background daemon, or component of an operating system, or combination thereof, executing in conjunction with the CPU 1301, a CPU 1303 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 1301 or the CPU 1303 may be a Xenon or a Core processor from Intel of America or an Opteron processor from Advanced Micro Devices (AMD) of America, or may be other processor types that would be recognized by one of ordinary skill in the art. Alternatively, the CPU 1301, the CPU 1303 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. The CPU 1301, the CPU 1303 may be implemented as multiple processors cooperatively working in parallel to perform the instructions of the inventive processes described above.

The computing device in FIG. 13 also includes a network controller 1306, such as an Intel Ethernet Professional (PRO) network interface card from an Intel Corporation of America, for interfacing with a network 1360. As can be appreciated, the network 1360 can be a public network, such as the Internet, or a private network such as a Local Area Network (LAN) or a Wide Area Network (WAN), or any combination thereof and can also include a Public Switched Telephone Network (PSTN) or an Integrated Services Digital Network (ISDN) sub-networks. The network 1360 can also be wired, such as an Ethernet network, or can be wireless such as a cellular network including EDGE, Third Generation (3G), Fourth Generation (4G), Fifth Generation (5G) or sixth Generation (6G) wireless cellular systems. The wireless network can also be a WiFi, a Bluetooth, or any other wireless form of communication that is known.

The computing device further includes a display controller 1308, such as a NVIDIA GeForce Giga Texel Shader eXtreme (GTX) or a Quadro graphics adaptor from a NVIDIA Corporation of America for interfacing with a display 1310, such as a Hewlett Packard HPL2445w Liquid Crystal Display (LCD) monitor. A general purpose I/O interface 1312 interfaces with a keyboard and/or mouse 1314 as well as a touch screen panel 1316 on or separate from display 1310. The general purpose I/O interface 1312 also connects to a variety of peripherals 1318 including printers and scanners, such as an OfficeJet or DeskJet from HP.

A sound controller 1320 is also provided in the computing device such as a Sound Blaster X-Fi Titanium from Creative, to interface with speakers/microphone 1322 thereby providing sounds and/or music.

A general purpose storage controller 1324 connects the storage medium disk 1304 with a communication bus 1326, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 1310, keyboard and/or mouse 1314, as well as the display controller 1308, the general purpose storage controller 1324, the network controller 1306, the sound controller 1320, and the general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

Figure 14:
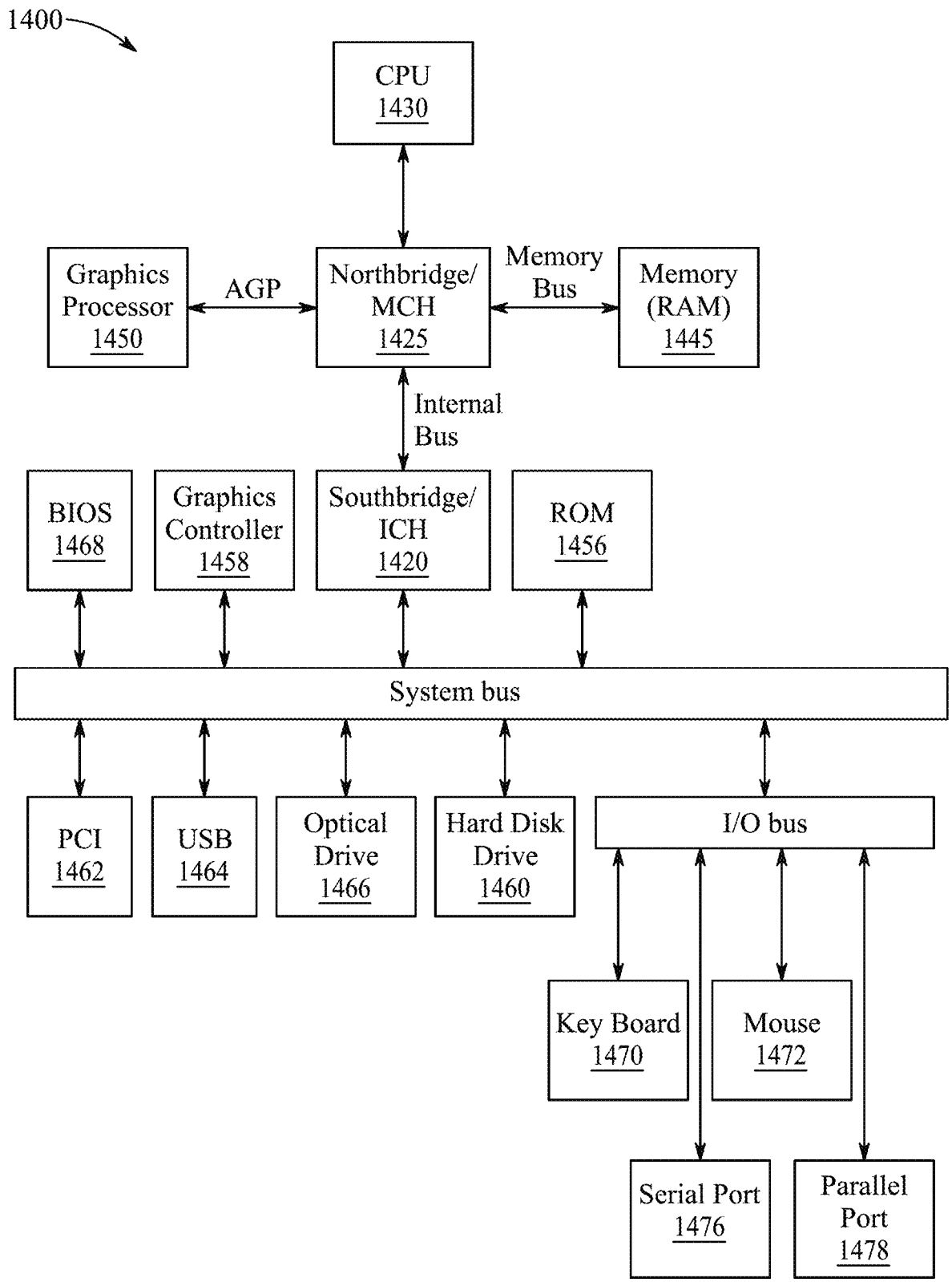
FIG. 14 is an exemplary schematic diagram of a data processing system used within the computing device, according to certain embodiments.

FIG. 14 shows a schematic diagram of a data processing system 1400, for performing the functions of the exemplary embodiments. The data processing system 1400 is an example of a computer in which code or instructions implementing the processes of the illustrative embodiments may be located.

In FIG. 14, the data processing system 1400 employs a hub architecture including a North Bridge and a Memory Controller Hub (NB/MCH) 1425 and a south bridge and an Input/Output (I/O) Controller Hub (SB/ICH) 1420. The CPU 1430 is connected to the NB/MCH 1425. The NB/MCH 1425 also connects to a memory 1445 via a memory bus and connects to a graphics processor 1450 via an Accelerated Graphics Port (AGP). The NB/MCH 1425 also connects to the SB/ICH 1420 via an internal bus (e.g., a unified media interface or a direct media interface). The CPU 1430 may contain one or more processors and even may be implemented using one or more heterogeneous processor systems.

Figure 15:
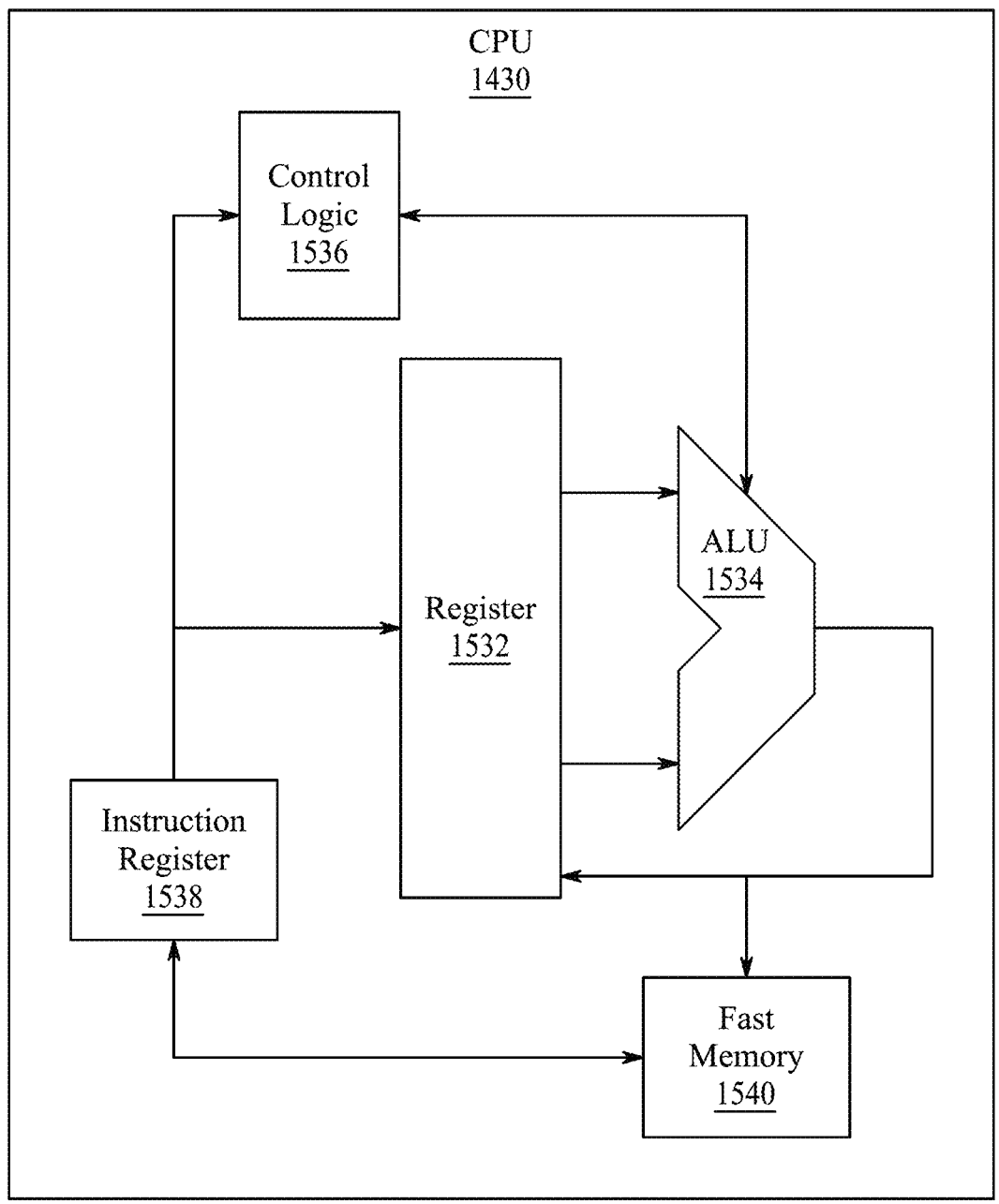
FIG. 15 is an exemplary schematic diagram of a processor used with the computing device, according to certain embodiments.

For example, FIG. 15 shows one implementation of the CPU 1430. In one implementation, an instruction register 1538 retrieves instructions from a fast memory 1540. At least part of these instructions is fetched from the instruction register 1538 by a control logic 1536 and interpreted according to the instruction set architecture of the CPU 1530. Part of the instructions can also be directed to a register 1532. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1534 that loads values from the register 1532 and performs logical and mathematical operations on the loaded values according to the instructions. The results from these operations can be feedback into the register 1532 and/or stored in the fast memory 1540. According to certain implementations, the instruction set architecture of the CPU 1430 can use a reduced instruction set architecture, a complex instruction set architecture, a vector processor architecture, a very large instruction word architecture. Furthermore, the CPU 1430 can be based on a Von Neuman model or a Harvard model. The CPU 1430 can be a digital signal processor, a Field-Programmable Gate Array (FPGA), an Application-Specific Integrated Circuit (ASIC), a Programmable Logic Array (PLA), a Programmable Logic Device (PLD), or a Complex Programmable Logic Device (CPLD). The CPU 1430 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 14, the data processing system 1400 can include that the SB/ICH 1420 is coupled through a system bus to an I/O Bus, a ROM 1456, a Universal Serial Bus (USB) port 1464, a flash Binary Input/Output System (BIOS) 1468, and a graphics controller 1458. Peripheral Component Interconnect/Peripheral Component Interconnect Express (PCI/PCIe) devices can also be coupled to SB/ICH 888 through a PCI bus 1462.

The PCI devices may include, for example, Ethernet adapters, add-in cards, and Personal Computer (PC) cards for notebook computers. The HDD 1460 and an optical drive 1466 (e.g., CD-ROM) can use, for example, an Integrated Drive Electronics (IDE) or a Serial Advanced Technology Attachment (SATA) interface. In one implementation, an I/O bus can include a super I/O (SIO) device.

The HDD 1460 and the optical drive 1466 can also be coupled to the SB/ICH 1420 through a system bus. In one implementation, a keyboard 1470, a mouse 1472, a serial port 1476, and a parallel port 1478 can be connected to the system bus through the I/O bus. Other peripherals and devices that can be connected to the SB/ICH 1420 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 16:
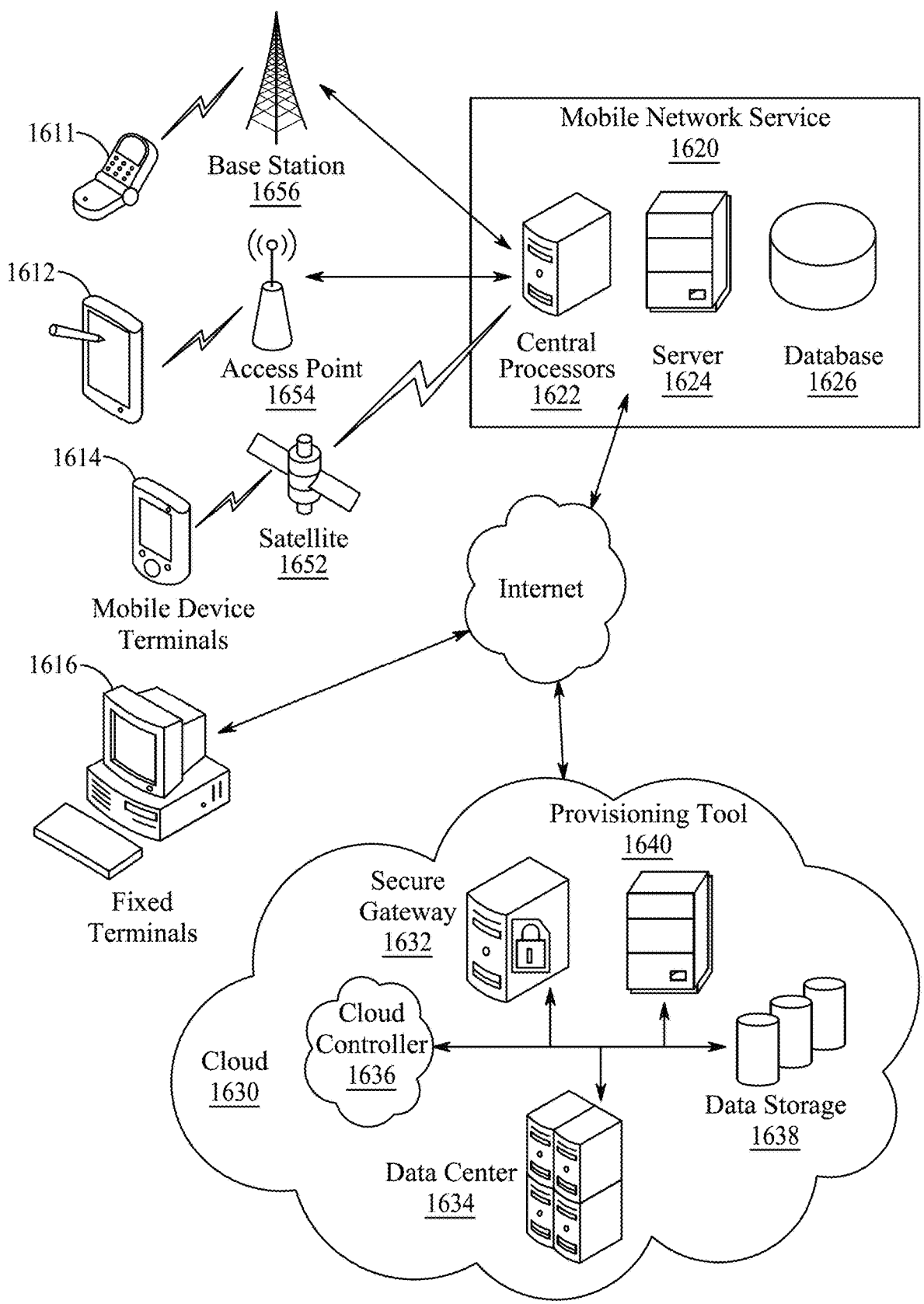
FIG. 16 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 16, in addition to various human interface and communication devices (e.g., display monitors, smart phones, tablets, personal digital assistants (PDAs)). More specifically, FIG. 16 illustrates client devices including a smart phone 1611, a tablet 1612, a mobile device terminal 1614 and fixed terminals 1616. These client devices may be commutatively coupled with a mobile network service 1620 via a base station 1656, an access point 1654, a satellite 1652 or via an internet connection. The mobile network service 1620 may comprise central processors 1622, a server 1624 and a database 1626. The fixed terminals 1616 and the mobile network service 1620 may be commutatively coupled via an internet connection to functions in cloud 1630 that may comprise a security gateway 1632, a data center 1634, a cloud controller 1636, a data storage 1638 and a provisioning tool 1640. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be described.

The above-described hardware description is a non-limiting example of corresponding structure for performing the functionality described herein.

Numerous modifications and variations of the present disclosure are possible in light of the above teachings. It is therefore, to be understood that within the scope of the appended claims, the invention may be practiced otherwise than as specifically described herein.

The invention claimed is:

1. An ultraprecision frequency-domain light detection and ranging (LiDAR) system for remote micro-movement sensing, comprising:
 a laser diode connected to a power source;
 a bandpass filter connected to the laser diode, wherein the bandpass filter is configured to modulate a power provided by the power source by a radio frequency (RF) signal, wherein the modulated power causes the laser diode to generate intensity modulated optical signals;
a Michelson interferometer including:
a 50/50 directional coupler connected to the laser diode, wherein the 50/50 directional coupler is configured to split the intensity modulated optical signals into a first optical path and a second optical path, wherein:
the first optical path comprises a fiber-optic delay line configured to generate phase shifted intensity modulated optical signals and a silver coated end connected to the fiber-optic delay line at a distance $l_1$ from the laser diode, wherein the silver coated end is configured to reflect the phase shifted intensity modulated optical signals back towards the 50/50 directional coupler,
the second optical path comprises a semiconductor optical amplifier (SOA) configured to amplify the intensity modulated optical signals on the second optical path to compensate for signal losses, an optical collimator connected between the SOA and a free-space propagation region and a target located beyond the free-space propagation region at a distance $l_2$ from the laser diode, wherein the target is configured to reflect the amplified intensity modulated optical signals back towards the 50/50 directional coupler along the second optical path;
a photodetector connected to the 50/50 directional coupler, wherein the photodetector is configured to receive the phase shifted intensity modulated optical signals and the amplified intensity modulated optical signals and convert the phase-shifted intensity modulated optical signals and the amplified intensity modulated optical signals into electrical signals; and
a feedback loop comprising the bandpass filter and a frequency-domain analyzer comprising one of a spectrum analyzer, a phase detector and a phase-locked loop, wherein the frequency-domain analyzer is configured to identify frequency shifts in the electrical signals induced by micro-movements of the target.

2. The ultraprecision frequency-domain LiDAR system of claim 1, wherein the fiber-optic delay line has a length of about 5 meters.

3. The ultraprecision frequency-domain LiDAR system of claim 1, further comprising:
a piezoelectric (PZT) fiber stretcher connected between the 50/50 directional coupler and the fiber-optic delay line, wherein the PZT fiber stretcher is configured to introduce an initial phase shift on the first optical path.

4. The ultraprecision frequency-domain LiDAR system of claim 3, further comprising:
a transimpedance amplifier connected between the photodetector and the bandpass filter, wherein the transimpedance amplifier is configured to transform the electrical signals to RF voltage signals.

5. The ultraprecision frequency-domain LiDAR system of claim 4, further comprising:
a phased clock generator connected between the bandpass filter and the spectrum analyzer, wherein the phased clock generator is configured to synchronize the RF voltage signals with a reference signal.

6. The ultraprecision frequency-domain LiDAR system of claim 5, further comprising an optical isolator connected to the laser diode, wherein the optical isolator is configured to prevent back reflections within the laser diode from entering the feedback loop.

7. The ultraprecision frequency-domain LiDAR system of claim 3, further comprising:
a transimpedance amplifier integrated with the photodetector, wherein the transimpedance amplifier is configured to transform the electrical signals to RF voltage signals.

8. The ultraprecision frequency-domain LiDAR system of claim 7, further comprising:
an active all-pass filter connected between the transimpedance amplifier and the bandpass filter, wherein the active all-pass filter is configured to phase shift the RF voltage signals and produce unity gain across all frequencies of the RF voltage signals.

9. The ultraprecision frequency-domain LiDAR system of claim 8, further comprising:
a reference signal input port integrated with the phase detector, wherein the reference signal input port is configured to receive the reference signal and reduce frequency drift by comparing the RF voltage signals to the reference signal.

10. The ultraprecision frequency-domain LiDAR system of claim 1, further comprising:
a fiber circulator connected to the laser diode, wherein the fiber circulator is configured to receive the intensity modulated optical signals generated by the laser diode at a first port, transmit the intensity modulated optical signals into the 50/50 directional coupler, receive the phase-shifted intensity modulated optical signals and the amplified intensity modulated optical signals at the second port and transmit the phase-shifted intensity modulated optical signals and the amplified intensity modulated optical signals from a third port to the photodetector, wherein the fiber circulator is configured to minimize back reflections and back scattering.

11. The ultraprecision frequency-domain LiDAR system of claim 10, further comprising:
an adaptive optics system connected between the SOA and the optical collimator, wherein the adaptive optics system is configured to mitigate atmospheric turbulence effects on the amplified intensity modulated optical signals in the free-space propagation region.

12. The ultraprecision frequency-domain LiDAR system of claim 11, further comprising:
an active all-pass filter connected between the bandpass filter and the photodetector, wherein the active all-pass filter is configured to phase shift the electrical signals with unity gain and transmit the phase shifted electrical signals to the bandpass filter.

13. The ultraprecision frequency-domain LiDAR system of claim 12, wherein the photodetector is connected to the phase-locked loop.

14. A method for detecting micro-movements of a remote target with an ultraprecision frequency-domain light detection and ranging (LiDAR) system, comprising:
generating, by a laser diode, radiofrequency (RF) intensity-modulated optical signals;
splitting, with a 50/50 directional coupler, the RF intensity-modulated optical signals into a first optical stream and a second optical stream;
phase-shifting the first optical stream by transmitting the first optical stream through a first optical path comprising a fiber-optic delay line;
reflecting, by a silver coated end connected to the fiber-optic delay line at a distance $l_1$ from the laser diode, the phase shifted intensity modulated optical signals back towards the 50/50 directional coupler;
transmitting the second optical stream through a second optical path;
collimating, by an optical collimator, the second optical stream;
transmitting the collimated second optical stream through a free-space propagation region to the target;
reflecting, by the target, the collimated second optical stream back into the optical collimator;
amplifying, by a semiconductor optical amplifier (SOA) connected between the 50/50 directional coupler and the optical collimator, the reflected collimated second optical stream;
recombining, by the 50/50 directional coupler, the reflected collimated second optical stream with the phase shifted intensity modulated optical signals;
transmitting the recombined reflected collimated second optical stream and the phase shifted intensity modulated optical signals to a photodetector;
converting, by the photodetector, the recombined reflected collimated second optical stream and the phase shifted intensity modulated optical signals into electrical signals;
generating, by a bandpass filter in a feedback loop, RF signals from the electrical signals;
intensity modulating a power signal provided to the laser diode with the RF signals; and
analyzing frequency shifts in the RF signals corresponding micro-movements of the target using a frequency-domain analyzer, wherein the frequency-domain analyzer comprises one of a spectrum analyzer, a phase detector and a phase-locked loop (PLL).

15. The method of claim 14, further comprising:
introducing, with a piezoelectric (PZT) fiber stretcher connected between the 50/50 directional coupler and the fiber optic delay line, an initial phase shift on the first optical path.

16. The method of claim 15, further comprising:
transforming, by a transimpedance amplifier connected between the photodetector and the bandpass filter, the electrical signals to RF voltage signals; and
synchronizing, with a phased clock generator connected between the bandpass filter and the spectrum analyzer, the RF voltage signals with a reference signal.

17. The method of claim 15, further comprising:
transforming, by a transimpedance amplifier integrated with the photodetector, the electrical signals to RF voltage signals;
phase shifting, with an active all-pass filter connected between the transimpedance amplifier and the bandpass filter, the RF voltage signals;
transforming, by the active all-pass filter, the phase-shifted RF voltage signals to have unity gain across all frequencies of the phase-shifted RF voltage signals;
receiving, at a reference signal input port integrated with the phase detector, a reference signal; and
reducing, with the phase detector, frequency drift by comparing the phase-shifted RF voltage signals having unity gain to the reference signal.

18. The method of claim 14, further comprising:
receiving, at a first port of a fiber circulator connected to the laser diode, the RF intensity modulated optical signals generated by the laser diode, wherein the fiber circulator is configured to minimize back reflections and back-scattering between the laser diode and the 50/50 directional coupler and between the 50/50 directional coupler and the photodetector;
transmitting, at a second port of the fiber circulator, the RF intensity modulated optical signals into the 50/50 directional coupler;
receiving, from the 50/50 directional coupler, the phase shifted intensity modulated optical signals and the amplified intensity modulated optical signals at the second port; and
transmitting, from a third port of the fiber circulator, the phase shifted intensity modulated optical signals and the amplified intensity modulated optical signals to the photodetector.

19. The method of claim 18, further comprising:
mitigating, with an adaptive optics system connected between the SOA and the optical collimator, atmospheric turbulence effects on the amplified intensity modulated optical signals in the free-space propagation region.

20. The method of claim 19, further comprising:
phase-shifting, by an active all-pass filter connected between the bandpass filter and the photodetector, the electrical signals with unity gain;
transmitting the phase-shifted electrical signals to the bandpass filter; and
transmitting the phase-shifted electrical signals to the phase locked loop.

\* \* \* \* \*